(12) United States Patent
Ayatsuka

(10) Patent No.: US 7,734,090 B2
(45) Date of Patent: Jun. 8, 2010

(54) INFORMATION PROCESSING DEVICE AND METHOD, AND PROGRAM

(75) Inventor: Yuji Ayatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 808 days.

(21) Appl. No.: 11/633,307

(22) Filed: Dec. 4, 2006

(65) Prior Publication Data

US 2007/0145139 A1    Jun. 28, 2007

(30) Foreign Application Priority Data

Dec. 6, 2005    (JP)    ............................... 2005-352023

(51) Int. Cl.
  *G06K 9/00* (2006.01)
  *G06K 9/36* (2006.01)
(52) U.S. Cl. .................................... 382/181; 235/462.1
(58) Field of Classification Search ................ 382/181, 382/183, 204, 206; 235/462.08, 462.09, 235/462.1, 462.11
See application file for complete search history.

(56) References Cited

U.S. PATENT DOCUMENTS 6,650,776 B2 * 11/2003 Ihara et al. .................. 382/181
6,786,412 B2 *  9/2004 Shimizu ................. 235/462.25

* cited by examiner

*Primary Examiner*—Daniel G Mariam
(74) *Attorney, Agent, or Firm*—Frommer Lawrence & Haug LLP; William S. Frommer

(57) ABSTRACT

Disclosed herein is an information processing device for recognizing a two-dimensional code in which predetermined information is coded by two-dimensionally arranging a plurality of cells according to a predetermined arrangement rule, the information processing device including detecting means and obtaining means. In the information processing device, the detecting means detects the position determining part on a basis of binarized data obtained as a result of binarizing the image of the two-dimensional code on a basis of a first threshold value. The obtaining means detects the arrangement rule of the cells present in the area identified by the position determining part on a basis of binarized data obtained as a result of binarizing the area identified by the position determining part on a basis of a second threshold value different from the first threshold value, and obtains the predetermined information.

10 Claims, 16 Drawing Sheets

| SETTING NUMBER | THRESHOLD VALUE |
|---|---|
| 1 | A |
| 2 | B |
| 3 | C |
| 4 | D |
| 5 | E |

HIGH ↕ LOW

FIG.12
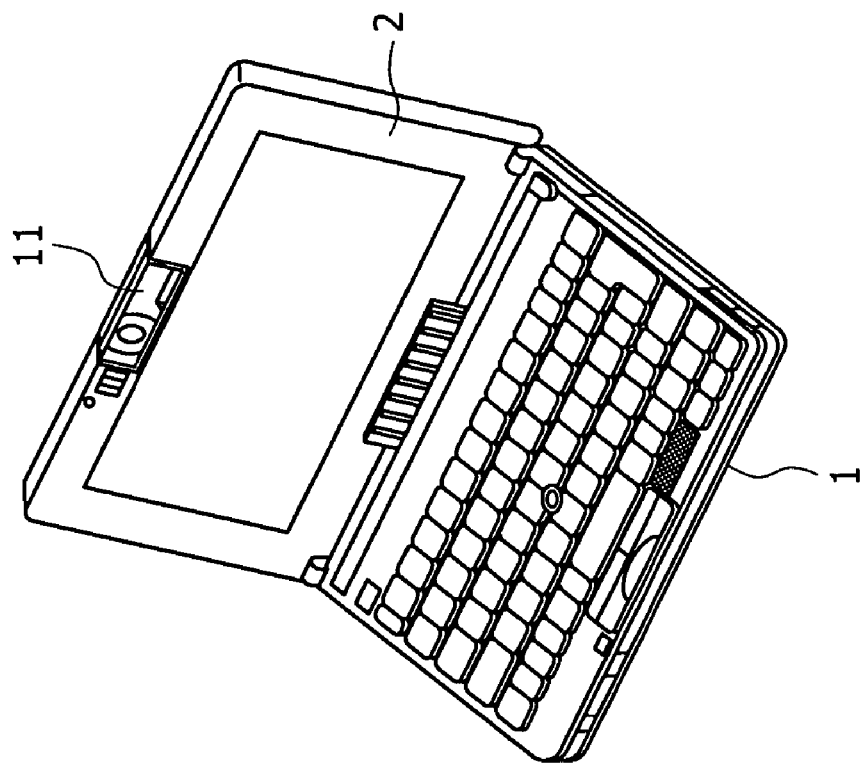
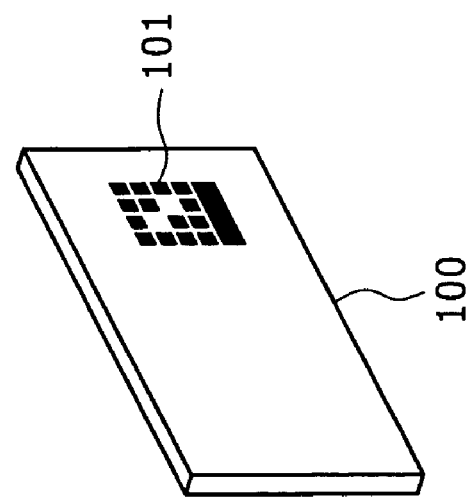

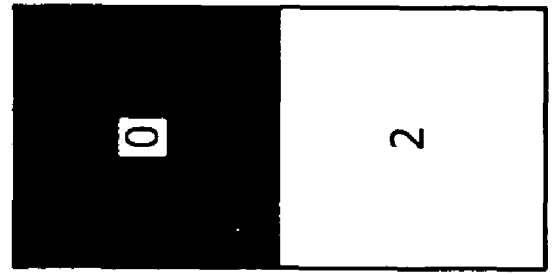
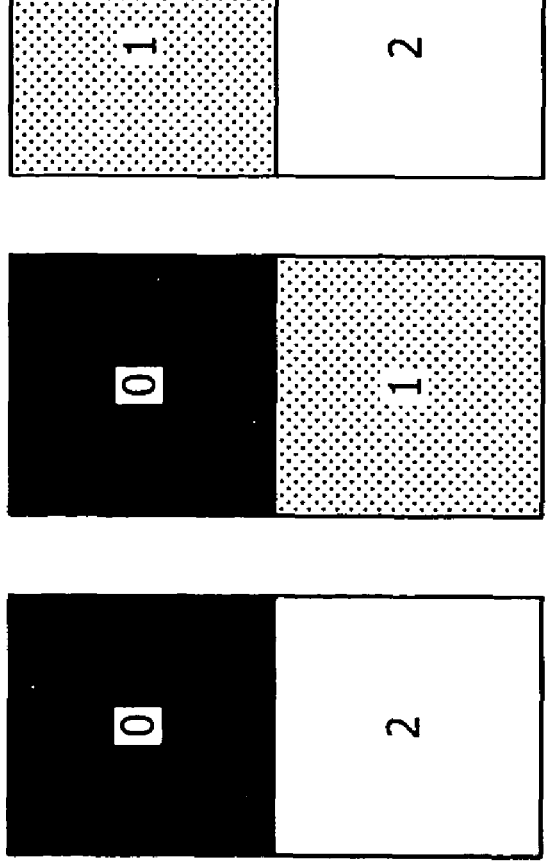

INFORMATION PROCESSING DEVICE AND METHOD, AND PROGRAM

CROSS REFERENCES TO RELATED APPLICATIONS

The present invention contains subject matter related to Japanese Patent Application JP 2005-352023 filed in the Japanese Patent Office on Dec. 6, 2005, the entire contents of which being incorporated herein by reference.

BACKGROUND OF THE INVENTION

1. Field of the Invention

The present invention relates to a device and a method for information processing, and a program, and particularly to a device and a method for information processing, and a program that can properly recognize a two-dimensional bar code.

2. Description of the Related Art

FIG. 1 shows an example of a two-dimensional bar code (hereinafter referred to as a 2D code) 101 recognized by a personal computer or the like, for example. By making the personal computer recognize the 2D code 101, it is possible to make the personal computer perform a process corresponding to predetermined information coded by the 2D code 101.

The 2D code 101 includes a guide part 111 and a code part 112 provided within an area of a rectangle having a length of 7 squares (hereinafter referred to as blocks) in an X-axis direction and a length of 9.5 blocks in a Y-axis direction.

The guide part 111 is formed by a rectangular cell having a length of 7 blocks in the X-axis direction and a length of 1.5 blocks in the Y-axis direction.

The code part 112 is provided one block away from the guide part 111. The code part 112 has square cells arranged in a two-dimensional pattern.

As shown in FIG. 2, the cells forming the code part 112 include an upper left corner cell 121-1 situated seven blocks away from a left end of the guide part 111 in an upward direction in the figure, an upper right corner cell 121-2 situated seven blocks away from a right end of the guide part 111 in the upward direction, a lower left corner cell 121-3 situated one block away from the left end of the guide part 111 in the upward direction, and a lower right corner cell 121-4 situated one block away from the right end of the guide part 111 in the upward direction. Incidentally, when the upper left corner cell 121-1, the upper right corner cell 121-2, the lower left corner cell 121-3, and the lower right corner cell 121-4 do not particularly need to be differentiated from each other, these corner cells will be referred to collectively as corner cells 121.

No cells are present in an area of three adjacent blocks (blocks represented by dotted lines in FIG. 2) around the corner cells 121.

Cells (hereinafter referred to as coded cells as appropriate) 122 other than the corner cells 121 in the code part 112 are arranged two-dimensionally according to predetermined alphanumeric characters and the like.

A personal computer detects the guide part 111 and the corner cells 121 in the code part 112 from an image of the 2D code 101, identifies an area where the code part 112 is present on the basis of the guide part 111 and the corner cells 121, and then obtains coded information from the arrangement pattern of the coded cells 122 present in the area.

A 2D code recognizing process in the past will next be described with reference to a flowchart of FIG. 3 (see Japanese Patent Laid-Open No. 2000-148904).

In step S1, the value of a counter i counting the setting of a threshold value representing a predetermined luminance value is initialized to one. In this example, as shown in FIG. 4, the threshold value is set in five steps. The magnitude of the threshold value is decreased stepwise from a threshold value A indicated at setting number 1, the threshold value A being the highest threshold value, to a threshold value E indicated at setting number 5.

Returning to FIG. 3, in step S2, image data of a 2D code 101 captured by a personal computer is subjected to a binarizing process on the basis of a threshold value of a setting number corresponding to the value of the counter i.

A pixel retaining a luminance value higher than the threshold value is coded into "1," and the pixel is made white on display. A pixel thus coded into "1" will hereinafter be referred to as a white pixel.

A pixel retaining a luminance value equal to or lower than the threshold value is coded into "0," and the pixel is made black on display. A pixel thus coded into "0" will hereinafter be referred to as a black pixel.

In next step S3, as shown in FIG. 5, numbers are set to areas where black pixels are connected to each other (hereinafter referred to as black pixel connected areas) (the areas are labeled) in order from an upper left to a lower right with an area where black pixels are connected to each other as one area.

In step S4, a total number M of black pixel connected areas labeled in step S3 is determined, and then whether the obtained total number M of black pixel connected areas is 257 or larger is determined. When M is 257 or larger, it is determined that the binarized image is not an appropriate image for a subsequent process. The process proceeds to step S5.

In step S5, whether the value of the counter i is equal to a number N (=5) of set threshold values (i=5) is determined. When the value of the counter i is not equal to five, the value of the counter i is incremented by one in step S6. The process returns to step S2. In step S2, the captured image data is subjected to the binarizing process again on the basis of a threshold value of a setting number corresponding to the value of the counter i incremented by one.

As described above, the threshold value A indicated at setting number 1 is the highest threshold value. When the binarizing process is performed on the basis of the threshold value A, luminance values of many pixels of the image data is lower than the threshold value A, and therefore many pixels are made to be black pixels, thus resulting in a large total number M of black pixel connected areas. Accordingly, when a result of the determination in step S4 is YES, the value of the counter i is incremented by one in step S5. Thus performing the binarizing process on the basis of a threshold value lower by one step can reduce the number of pixels made to be black pixels, that is, black pixel connected areas.

When it is determined in step S5 that i=5, that is, when an appropriate total number M of black pixel connected areas are not generated on the basis of any of the threshold values A to E, it is determined that the image data for one frame does not include an image of a 2D code 101. Then the process is ended.

When it is determined in step S4 that the total number of black pixel connected areas is smaller than 257, the process proceeds to step S7, where a guide part detecting process is performed. Details of the guide part detecting process in step S7 will be described with reference to a flowchart of FIG. 6.

First, in step S21, the value of a counter j counting the number of black pixel connected areas is initialized to one. Next, in step S22, a search is made for a black pixel connected area along a locus of a counterclockwise spiral from a center point of a frame, for example. A black pixel connected area detected first is selected as a guide part candidate area.

In next step S23, a side AT and a side BT of the guide part candidate area selected in step S22 are determined, the side AT and the side BT corresponding to a long axis (hereinafter referred to as a side A) and a short axis (hereinafter referred to as a side B) of a guide part 111. As shown in FIG. 7, the side AT is a line formed by projecting the black pixel connected area on the X-axis of the image (X-axis projection line), and the side BT is a line formed by projecting the black pixel connected area on the Y-axis of the image (Y-axis projection line).

In next step S24, whether the side BT corresponding to the short axis is formed by less than 20 pixels is determined. When a black pixel connected area having a short axis (side B) formed by less than 20 pixels is a guide part 111, for example, the length of one side of one block obtained at a ratio of one to 1.5, 1.5 being the length of the side B, as shown in FIG. 1 is shortened, so that a minimum cell (a cell of a 1×1 block area) is not displayed properly. Thus, when the side BT is formed by less than 20 pixels, it is determined that the black pixel connected area selected this time in step S22 is not a guide part 111. The process proceeds to step S25.

In step S25, whether the value of the counter j is equal to the total number M of black pixel connected areas (j=M) is determined. When it is determined that j is not equal to M, the process proceeds to step S26, where the value of the counter j is incremented by one. The process thereafter returns to step S22. Then, a black pixel connected area detected next is set as a next guide part candidate area, and a similar process is performed.

When it is determined in step S24 that the side BT of the guide part candidate area selected in step S22 is formed by 20 pixels or more, the process proceeds to step S27, where whether the side AT of the guide part candidate area is formed by more than 300 pixels is determined. When a black pixel connected area having a long axis (side A) formed by more than 300 pixels is a guide part 111, for example, the length of one side of one block obtained at a ratio of one to seven, seven being the length of the side A, as shown in FIG. 1 is increased, so that an upper left corner cell 121-1 and an upper right corner cell 121-2 situated seven blocks away from the guide part 111 as shown in FIG. 2 are not displayed. Thus, when the side AT is formed by more than 300 pixels, it is determined that the black pixel connected area selected this time in step S22 is not a guide part 111. The process proceeds to step S25.

When it is determined in step S27 that the side AT of the guide part candidate area selected in step S22 is not formed by more than 300 pixels (is formed by 300 pixels or less), the process proceeds to step S28.

In step S28, whether a total number of black pixels of the guide part candidate area is 20 or larger and smaller than 1500 is determined. When it is determined that the total number of black pixels of the guide part candidate area is smaller than 20 or 1500 or larger, the process proceeds to step S25. When the total number of black pixels is smaller than 20, there occurs a same problem as in the case where the side BT is formed by less than 20 pixels in step S24. When the total number of black pixels is 1500 or larger, there occurs a same problem as in the case where the side AT is formed by more than 300 pixels in step S27. In both cases, it is unlikely that the guide part candidate area is the guide part 111.

When it is determined in step S28 that the total number of black pixels of the guide part candidate area is 20 or larger and smaller than 1500, the process proceeds to step S29, where likelihood (fitness) of the guide part candidate area selected in step S22 being a rectangle is determined. When the guide part candidate area is a rectangle, the process proceeds to step S30.

In step S30, whether a ratio of the long axis to the short axis of the guide part candidate area judged to be a rectangle in step S29 is 2.0 or higher and 25 or lower is determined. When the ratio is 2.0 or higher and 25 or lower, the process proceeds to step S31.

In step S31, the guide part candidate area selected in step S22 is set as (assumed to be) the guide part 111, and for example the number of the black pixel connected area as the guide part candidate area is stored. The process is ended when the guide part 111 is thus detected.

When it is determined in step S28 that the total number of black pixels is smaller than 20 or 1500 or larger, when it is determined in step S29 that the guide part candidate area is not a rectangle, or when it is determined in step S30 that the ratio between the side AT and the side BT is lower than 2.0 or 25 or higher, it is determined that the guide part candidate area selected this time in step S22 is not the guide part 111. The process proceeds to step S25. A black pixel connected area detected next is set as a next guide part candidate area, and the subsequent process is performed.

When it is determined in step S25 that the value of the counter j is equal to the total number M of black pixel connected areas (j=M), the guide part 111 is not set in step S31, and the process is ended. That is, it is determined that the image data (one frame) subjected to the 2D code recognizing process this time does not include the guide part 111.

When the guide part detecting process as described above is completed, the process proceeds to next step S8 in FIG. 3.

In step S8, whether the guide part 111 has been detected in step S7 is determined. When it is determined that the guide part 111 has been detected, the process proceeds to step S9, where a code part detecting process is performed. Details of the code part detecting process will be described with reference to a flowchart of FIG. 8.

In step S41, the value of a counter j counting the number of black pixel connected areas detected in step S3 in FIG. 3 is initialized to one. In step S42, a black pixel connected area having a number corresponding to the value is detected, and the black pixel connected area is selected as an upper left corner cell candidate area.

In next step S43, whether a ratio between the lengths of a side AT and a side BT of the upper left corner cell candidate area selected in step S42, the side AT and the side BT being determined as shown in FIG. 7, is three or lower is determined. When it is determined that the ratio is three or lower, the process proceeds to step S44.

In step S44, whether the upper left corner cell candidate area selected in step S42 is present within a search region set in advance with respect to the guide part 111 detected in step S7 in FIG. 3 is determined. When it is determined that the upper left corner cell candidate area is present within the search region, the upper left corner cell candidate area is set as (assumed to be) an upper left corner cell 121-1 in step S45.

When it is determined in step S43 that the ratio of the length of the side BT to the length of the side AT is higher than three, or when it is determined in step S44 that the upper left corner cell candidate area is not present within the search region, it is determined that the black pixel connected area selected in step S42 is not the upper left corner cell 121-1. The process proceeds to step S46, where whether the value of the counter j is equal to the total number M of black pixel connected areas (j=M) is determined. When it is determined that j is not equal to M, the process proceeds to step S47, where the value of the counter j is incremented by one. The process thereafter returns to step S42. Then, a black pixel connected area having a next number is set as a next upper left corner cell candidate area, and a similar process is performed.

After the upper left corner cell 121-1 is set in step S45, the process proceeds to step S48, where the value of another counter k counting the number of black pixel connected areas is initialized to two. In next step S49, a black pixel connected area having a number corresponding to the value of the counter k is detected, and the black pixel connected area is selected as an upper right corner cell candidate area.

In next step S50, a ratio between the number of pixels (area) of the upper left corner cell 121-1 set in step S45 and the number of pixels (area) of the upper right corner cell candidate area selected in step S49 is calculated, and whether the ratio (area ratio) is six or lower is determined. When it is determined that the ratio is six or lower, the process proceeds to step S51.

In step S51, the area (number of pixels) of the upper left corner cell 121-1 set in step S45, the area (number of pixels) of the upper right corner cell candidate area selected in step S49, and a distance (D) between a center point of the upper left corner cell 121-1 and a center point of the upper right corner cell candidate area are calculated, and whether Equation (1) and Equation (2) hold is determined.

$$(S1/D^2) \leq 900 \quad (1)$$

$$(S2/D^2) \leq 900 \quad (2)$$

When it is determined in step S51 that Equation (1) and Equation (2) hold, the process proceeds to step S52, where the upper right corner cell candidate area selected in step S49 is set (assumed to be) an upper right corner cell 121-2.

After the upper right corner cell 121-2 is set (assumed), in step S55, an area defined by the upper left corner cell 121-1 set in step S45, the upper right corner cell 121-2 set in step S52, and the guide part 111 set in step S7 in FIG. 3 is subjected to an affine transformation so as to convert the defined area to an area having a length of seven blocks in an X-axis direction and a length of 9.5 blocks in a Y-axis direction on display. Incidentally, the length of one side of one block is calculated on the basis of the side AT or the side BT of the guide part 111 set in step S7 in FIG. 3.

In next step S56, an area (7×2.5 block area) of the guide part 111 set in step S7 in FIG. 3 and a 7×1 block on an upper side of the guide part 111 (a block corresponding to a 7×1 block between the guide part 111 and a code part 112) (FIG. 1) is removed from the image resulting from the transformation in step S55. The black pixel connected areas are mapped as cells onto the region of a 7×7 block area obtained as a result of the removal, and thereby a code map is generated.

In step S57, four corner cells among the cells on the code map generated in step S56 are detected. Because no cells are present in three-block areas around the corner cells 121 (FIG. 2), whether the three-block areas around the four corner cells are white pixels is determined. When the three-block areas around the four corner cells are white blocks, the process proceeds to step S58, where the code map generated in step S56 is set as (assumed to be) the code part 112 of the 2D code 101. Thus, the code part 112 is detected. Then the process is ended.

When it is determined in step S50 that the area ratio is higher than six, when it is determined in step S51 that Equation (1) and Equation (2) do not hold, or when it is determined in step S57 that the three-block areas around the four corner cells are not white pixels, the process proceeds to step S53, where whether the value of the counter k is equal to the total number M of black pixel connected areas (k=M) is determined. When it is determined that k is not equal to M, the process proceeds to step S54, where the value of the counter k is incremented by one. The process thereafter returns to step S49. Then, a black pixel connected area having a next number is set as a next upper right corner cell candidate area, and a similar process is performed.

When it is determined in step S53 that the value of the counter k is equal to the total number M of black pixel connected areas, the process returns to step S46. When it is determined in the process of step S46 that j is not equal to M, the value of the counter j is incremented by one in step S47. The process returns to step S42, where a black pixel connected area having a next number is set as a next upper left corner cell candidate area. Then the subsequent process is performed.

When it is determined in step S46 that j=M, it is determined that a 2D code 101 is not present in the image being subjected to the 2D code recognizing process this time. Then the process is ended.

When the code part detecting process as described above is completed, the process proceeds to step S10 in FIG. 3, where whether the code part 112 has been detected is determined. When it is determined that the code part 112 has been detected, code data, that is, the value of the 2D code 101 is calculated from the code map of the detected code part 112, and the value of the 2D code 101 is retained in step S11. Thereafter the process is ended.

When it is determined in step S8 that the guide part 111 has not been detected, or when it is determined in step S10 that the code part 112 has not been detected, it is determined that the image data subjected to the 2D code recognizing process this time does not include the 2D code 101. Then the process is ended.

Thus, the 2D code 101 is recognized.

SUMMARY OF THE INVENTION

Suppose that the image data of a 2D code 101 when some shadow is cast on the 2D code 101 as shown in FIG. 9, for example, is subjected to the above-described 2D code recognizing process. In this case, even when the threshold value is set at a value corresponding to the number of black pixel connected areas in the process of step S4 in FIG. 3, a part where luminance values are lowered by the shadow (a darkened part) is converted to black pixels (Br-1 in FIG. 10), as shown in FIG. 10, when the threshold value is set at a high value, for example. The guide part 111 and the black pixels are connected to each other to form one black pixel connected area. Therefore the guide part 111 is not properly detected (for example step S29 in FIG. 6).

Incidentally, in this case, the code part 112 is identified by the guide part 111 and the corner cells 121, and the outside of the area identified by the guide part 111 and the corner cells 121 is not treated as the code part 112. Specifically, for example, even when a part of the shadow in the vicinity of the code part 112 is black pixels (for example Br-2 in FIG. 10), and is connected to a coded cell 122 of the code part 112 to form one black pixel connected area, the part is excluded, and the code part 112 is recognized. Therefore no particular problem is presented.

When the threshold value is set to a low value, on the other hand, light parts distant from the shadow in the code part 112 (FIG. 9), which parts are indicated by frames of a dotted line in FIG. 11, for example, are not black pixels, so that the value of the 2D code 101 may not be properly read.

Incidentally, in this case (FIG. 11), the black pixel connected area Br-1 resulting from the shadow as shown in FIG. 10 is not present in the guide part 111, and thus the guide part 111 is detected properly.

Thus, in the past, when the 2D code 101 is partly darkened by a shadow, for example, the 2D code 101 may not be properly recognized.

The present invention has been made in view of the above, and it is desirable that the 2D code 101 be recognized properly even when the 2D code 101 is partly darkened by a shadow, for example.

According to an embodiment of the present invention, there is provided an information processing device for recognizing a two-dimensional code in which predetermined information is coded by two-dimensionally arranging a plurality of cells according to a predetermined arrangement rule, the information processing device including: detecting means for detecting a position determining part used to identify an area of the cells in an image of the two-dimensional code in which area the predetermined information is coded; and obtaining means for obtaining the predetermined information from the arrangement rule of the cells present in the area identified by the position determining part detected by the detecting means. In the information processing device, the detecting means detects the position determining part on a basis of binarized data obtained as a result of binarizing the image of the two-dimensional code on a basis of a first threshold value, and the obtaining means detects the arrangement rule of the cells present in the area identified by the position determining part on a basis of binarized data obtained as a result of binarizing the area identified by the position determining part on a basis of a second threshold value different from the first threshold value, and obtains the predetermined information.

The information processing device can further include ternarizing means for ternarizing the image of the two-dimensional code on the basis of the first threshold value and the second threshold value. In the information processing device, the detecting means can binarize ternarized data obtained as a result of ternarizing the image of the two-dimensional code by the ternarizing means on the basis of the first threshold value, and the obtaining means can binarize the ternarized data obtained as the result of ternarizing the image of the two-dimensional code by the ternarizing means on the basis of the second threshold value.

The detecting means can detect the position determining part on a basis of the binarized data obtained as the result of binarizing the image of the two-dimensional code on the basis of the first threshold value and binarized data obtained as a result of binarizing the image of the two-dimensional code on the basis of the second threshold value, and the obtaining means can detect the arrangement rule of the cells present in the area identified by the position determining part on a basis of the binarized data obtained as the result of binarizing the area identified by the position determining part on the basis of the second threshold value and binarized data obtained as a result of binarizing the area identified by the position determining part on the basis of the first threshold value, and obtain the predetermined information.

According to an embodiment of the present invention, there is provided an information processing method for recognizing a two-dimensional code in which predetermined information is coded by two-dimensionally arranging a plurality of cells according to a predetermined arrangement rule, or a program for making a computer perform information processing for recognizing a two-dimensional code in which predetermined information is coded by two-dimensionally arranging a plurality of cells according to a predetermined arrangement rule, the information processing method or the program including the steps of: detecting a position determining part used to identify an area of the cells in an image of the two-dimensional code in which area the predetermined information is coded; obtaining the predetermined information from the arrangement rule of the cells present in the area identified by the position determining part detected by a process of the detecting step. In the information processing method or the program, the detecting step detects the position determining part on a basis of binarized data obtained as a result of binarizing the image of the two-dimensional code on a basis of a first threshold value, and the obtaining step detects the arrangement rule of the cells present in the area identified by the position determining part on a basis of binarized data obtained as a result of binarizing the area identified by the position determining part on a basis of a second threshold value different from the first threshold value, and obtains the predetermined information.

The information processing device, the information processing method, or the program according to the above-described embodiments of the present invention detects a position determining part used to identify an area of the cells in an image of the two-dimensional code in which area the predetermined information is coded, and obtains the predetermined information from the arrangement rule of the cells present in the area identified by the detected position determining part. At this time, the position determining part is detected on a basis of binarized data obtained as a result of binarizing image of the two-dimensional code on a basis of a first threshold value, the arrangement rule of the cells present in the area identified by the position determining part is detected on a basis of binarized data obtained as a result of binarizing the area identified by the position determining part on a basis of a second threshold value different from the first threshold value, and the predetermined information is obtained.

According to an embodiment of the present invention, there is provided an information processing device for recognizing a two-dimensional code in which predetermined information is coded by two-dimensionally arranging a plurality of cells according to a predetermined arrangement rule, the information processing device including: detecting means for detecting a position determining part used to identify an area of the cells in an image of the two-dimensional code in which area the predetermined information is coded on a basis of binarized data obtained as a result of binarizing the image of the two-dimensional code on a basis of a first threshold value; and obtaining means for detecting the arrangement rule of the cells present in the area identified by the position determining part on a basis of binarized data obtained as a result of binarizing the area identified by the position determining part on a basis of a second threshold value different from the first threshold value, and obtaining the predetermined information from the arrangement rule. In the information processing device, one of the detecting means and the obtaining means binarizes ternarized data obtained as a result of ternarizing the image of the two-dimensional code in each unit of a plurality of pieces of ternarized data in predetermined positional relation to each other on a basis of relative relation of the plurality of pieces of ternarized data.

According to an embodiment of the present invention, there is provided an information processing method for recognizing a two-dimensional code in which predetermined information is coded by two-dimensionally arranging a plurality of cells according to a predetermined arrangement rule, or a program for making a computer perform information processing for recognizing a two-dimensional code in which predetermined information is coded by two-dimensionally arranging a plurality of cells according to a predetermined arrangement rule, the information processing method or the program including the steps of: detecting a position determining part used to identify an area of the cells in an image of the two-dimensional code in which area the predetermined information is coded on a basis of binarized data obtained as a result of binarizing the image of the two-dimensional code on a basis of a first threshold value; and detecting the arrangement rule of the cells present in the area identified by the position determining part on a basis of binarized data obtained as a result of binarizing the area identified by the position determining part on a basis of a second threshold value different from the first threshold value, and obtaining the predetermined information from the arrangement rule. In the information processing method or the program, one of the detecting step and the obtaining step binarizes ternarized data obtained as a result of ternarizing the image of the two-dimensional code in each unit of a plurality of pieces of ternarized data in predetermined positional relation to each other on a basis of relative relation of the plurality of pieces of ternarized data.

The information processing device, the information processing method, or the program according to the above-described embodiments of the present invention detects a position determining part used to identify an area of the cells in an image of the two-dimensional code in which area the predetermined information is coded on a basis of binarized data obtained as a result of binarizing the image of the two-dimensional code on a basis of a first threshold value, detects the arrangement rule of the cells present in the area identified by the position determining part on a basis of binarized data obtained as a result of binarizing the area identified by the position determining part on a basis of a second threshold value different from the first threshold value, and obtains the predetermined information from the arrangement rule. At this time, ternarized data obtained as a result of ternarizing the image of the two-dimensional code is binarized in each unit of a plurality of pieces of ternarized data in predetermined positional relation to each other on a basis of relative relation of the plurality of pieces of ternarized data.

According to the above-described embodiments of the present invention, it is possible to recognize the 2D code properly.

BRIEF DESCRIPTION OF THE DRAWINGS

FIG. 12 is a diagram showing an example of use of a personal computer to which the present invention is applied;

FIGS. 19A and 19B are diagrams of assistance in explaining another example of a binarizing process.

DETAILED DESCRIPTION OF THE PREFERRED EMBODIMENTS

Figure 1:
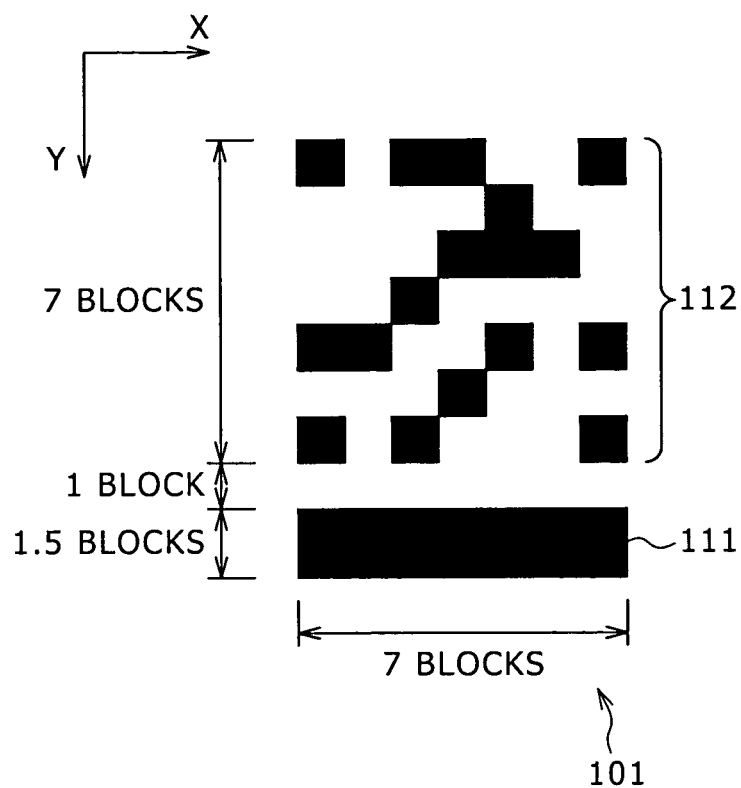
FIG. 1 is a diagram showing an example of a 2D code.

Preferred embodiments of the present invention will hereinafter be described. Correspondences between constitutional requirements of the present invention and embodiments described in the specification or the drawings are illustrated as follows. This description is to confirm that embodiments supporting the present invention are described in the specification or the drawings. Therefore, even when there is an embodiment described in the specification or drawings but not described here as an embodiment corresponding to a constitutional requirement of the present invention, it does not signify that the embodiment does not correspond to the constitutional requirement. Conversely, even when an embodiment is described here as corresponding to a constitutional requirement, it does not signify that the embodiment does not correspond to constitutional requirements other than that constitutional requirement.

According to an embodiment of the present invention, an information processing device (personal computer 1 in FIG. 12, for example) for recognizing a two-dimensional code in which predetermined information is coded by two-dimensionally arranging a plurality of cells according to a predetermined arrangement rule includes: detecting means (code recognizing unit 42 in FIG. 13, for example) for detecting a position determining part used to identify an area of the cells in an image of the two-dimensional code in which area the predetermined information is coded; and obtaining means (code recognizing unit 42 in FIG. 13, for example) for obtaining the predetermined information from the arrangement rule of the cells present in the area identified by the position determining part detected by the detecting means. In the information processing device, the detecting means detects the position determining part on a basis of binarized data obtained as a result of binarizing the image of the two-dimensional code on a basis of a first threshold value, and the obtaining means detects the arrangement rule of the cells present in the area identified by the position determining part on a basis of binarized data obtained as a result of binarizing the area identified by the position determining part on a basis of a second threshold value different from the first threshold value, and obtains the predetermined information.

The information processing device can further include ternarizing means (code recognizing unit 42 in FIG. 13 performing a process of step S101 in FIG. 14, for example) for ternarizing the image of the two-dimensional code on the basis of the first threshold value and the second threshold value. In the information processing device, the detecting means can binarize ternarized data obtained as a result of ternarizing the image of the two-dimensional code by the ternarizing means on the basis of the first threshold value (step S121 in FIG. 17, for example), and the obtaining means can binarize the ternarized data obtained as the result of ternarizing the image of the two-dimensional code by the ternarizing means on the basis of the second threshold value (step S151 in FIG. 18, for example).

The detecting means can detect the position determining part on a basis of the binarized data (binarized image in FIG. 10, for example) obtained as the result of binarizing the image of the two-dimensional code on the basis of the first threshold value and binarized data (binarized image in FIG. 11, for example) obtained as a result of binarizing the image of the two-dimensional code on the basis of the second threshold value, and the obtaining means can detect the arrangement rule of the cells present in the area identified by the position determining part on a basis of the binarized data (binarized image in FIG. 11, for example) obtained as the result of binarizing the area identified by the position determining part on the basis of the second threshold value and binarized data (binarized image in FIG. 10, for example) obtained as a result of binarizing the area identified by the position determining part on the basis of the first threshold value, and obtain the predetermined information.

Figure 14:
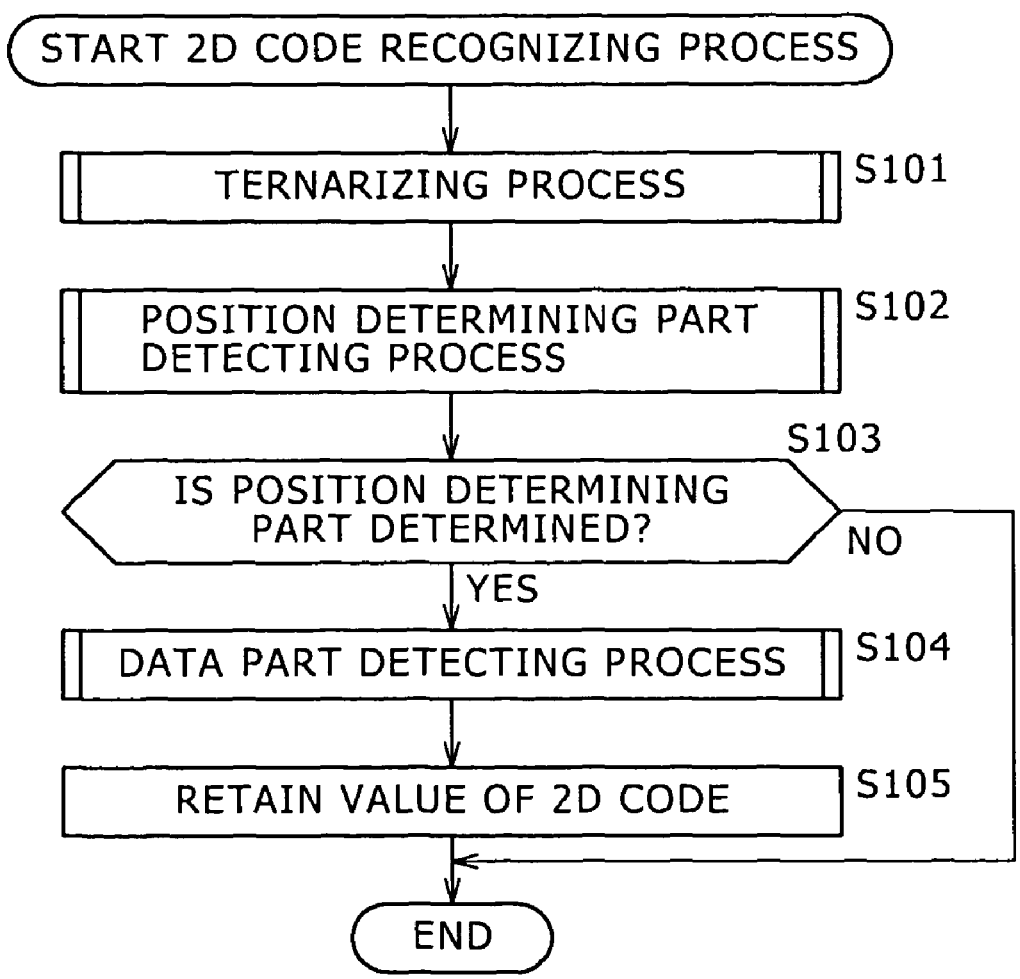
FIG. 14 is a flowchart of assistance in explaining a 2D code recognizing process in the personal computer in FIG. 12.

According to an embodiment of the present invention, an information processing method for recognizing a two-dimensional code in which predetermined information is coded by two-dimensionally arranging a plurality of cells according to a predetermined arrangement rule, or a program for making a computer perform information processing for recognizing a two-dimensional code in which predetermined information is coded by two-dimensionally arranging a plurality of cells according to a predetermined arrangement rule includes the steps of: detecting a position determining part used to identify an area of the cells in an image of the two-dimensional code in which area the predetermined information is coded (step S102 in FIG. 14, for example); and obtaining the predetermined information from the arrangement rule of the cells present in the area identified by the position determining part detected by a process of the detecting step (step S104 and step S105 in FIG. 14, for example). In the information processing method or the program, the detecting step detects the position determining part on a basis of binarized data obtained as a result of binarizing the image of the two-dimensional code on a basis of a first threshold value, and the obtaining step detects the arrangement rule of the cells present in the area identified by the position determining part on a basis of binarized data obtained as a result of binarizing the area identified by the position determining part on a basis of a second threshold value different from the first threshold value, and obtains the predetermined information.

According to an embodiment of the present invention, an information processing device for recognizing a two-dimensional code in which predetermined information is coded by two-dimensionally arranging a plurality of cells according to a predetermined arrangement rule includes: detecting means (code recognizing unit 42 in FIG. 13, for example) for detecting a position determining part used to identify an area of the cells in an image of the two-dimensional code in which area the predetermined information is coded on a basis of binarized data obtained as a result of binarizing the image of the two-dimensional code on a basis of a first threshold value; and obtaining means (code recognizing unit 42 in FIG. 13, for example) for detecting the arrangement rule of the cells present in the area identified by the position determining part on a basis of binarized data obtained as a result of binarizing the area identified by the position determining part on a basis of a second threshold value different from the first threshold value, and obtaining the predetermined information from the arrangement rule. In the information processing device, one of the detecting means and the obtaining means binarizes ternarized data obtained as a result of ternarizing the image of the two-dimensional code in each unit of a plurality of pieces of ternarized data in predetermined positional relation to each other on a basis of relative relation of the plurality of pieces of ternarized data (FIG. 19, for example).

According to an embodiment of the present invention, an information processing method for recognizing a two-dimensional code in which predetermined information is coded by two-dimensionally arranging a plurality of cells according to a predetermined arrangement rule, or a program for making a computer perform information processing for recognizing a two-dimensional code in which predetermined information is coded by two-dimensionally arranging a plurality of cells according to a predetermined arrangement rule includes the steps of: detecting a position determining part used to identify an area of the cells in an image of the two-dimensional code in which area the predetermined information is coded on a basis of binarized data obtained as a result of binarizing the image of the two-dimensional code on a basis of a first threshold value; and detecting the arrangement rule of the cells present in the area identified by the position determining part on a basis of binarized data obtained as a result of binarizing the area identified by the position determining part on a basis of a second threshold value different from the first threshold value, and obtaining the predetermined information from the arrangement rule. In the information processing method or the program, one of the detecting step and the obtaining step binarizes ternarized data obtained as a result of ternarizing the image of the two-dimensional code in each unit of a plurality of pieces of ternarized data in predetermined positional relation to each other on a basis of relative relation of the plurality of pieces of ternarized data (FIG. 19, for example).

FIG. 12 is a diagram showing an example of use of a personal computer 1 to which the present invention is applied.

The personal computer 1 recognizes a 2D code 101 from image data including an image of the 2D code 101 which image is picked up by a camera 11 provided on an upper side of a monitor 2, and performs a process corresponding to predetermined information coded by the 2D code 101.

Figure 2:
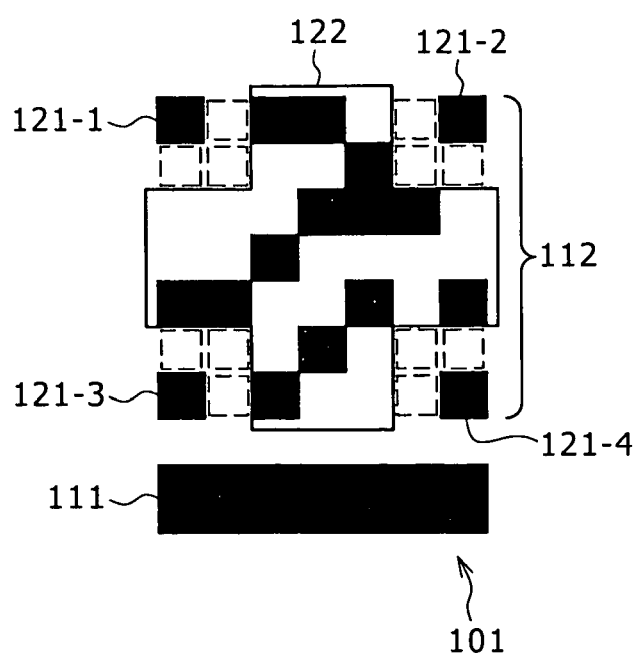
FIG. 2 is another diagram showing the example of the 2D code.
Figure 3:
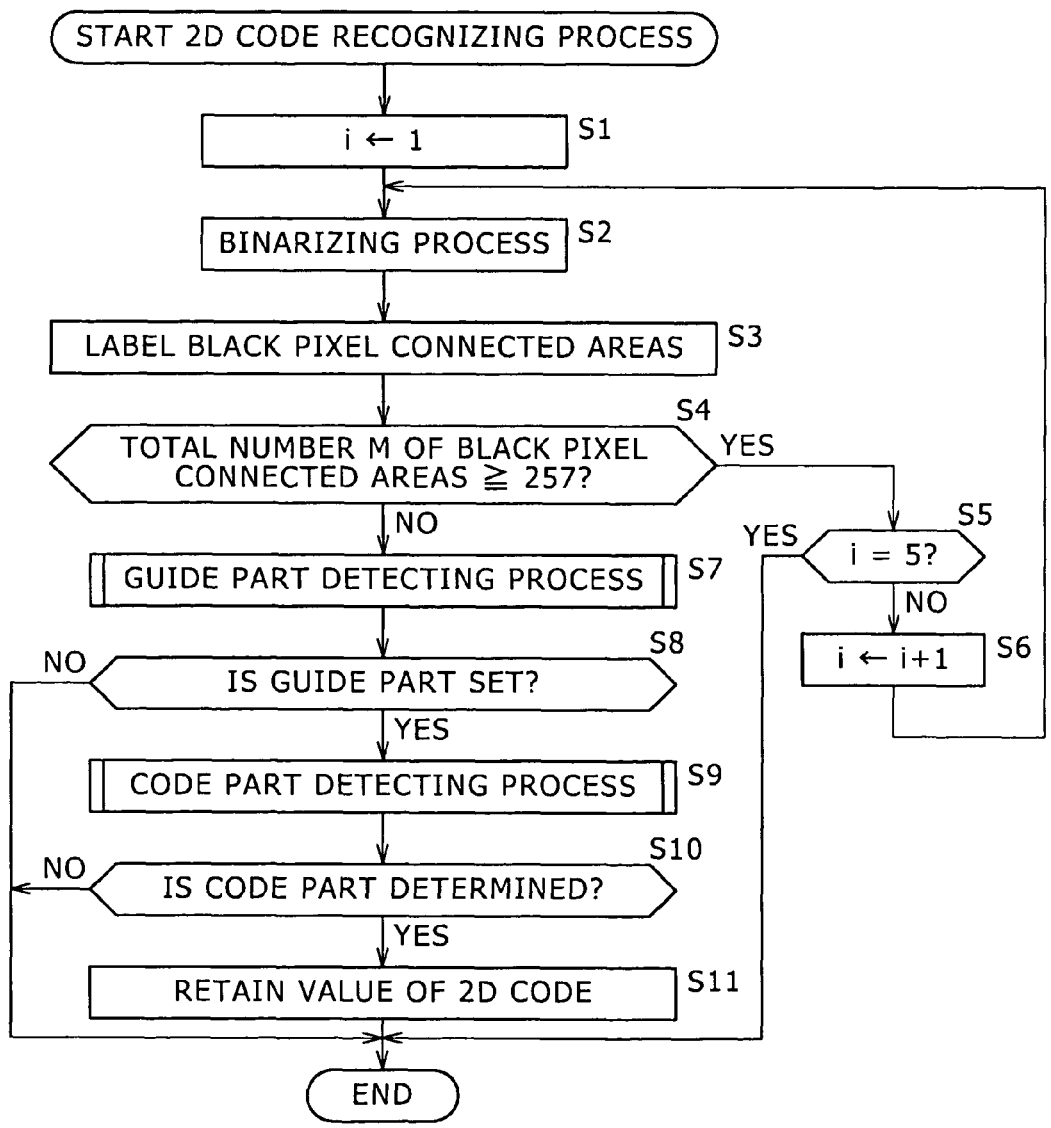
FIG. 3 is a flowchart of assistance in explaining an established 2D code recognizing process.

The 2D code 101 is formed as shown in FIG. 1 and FIG. 2. Incidentally, in this example, the 2D code 101 is printed on a card 100.

Figure 13:
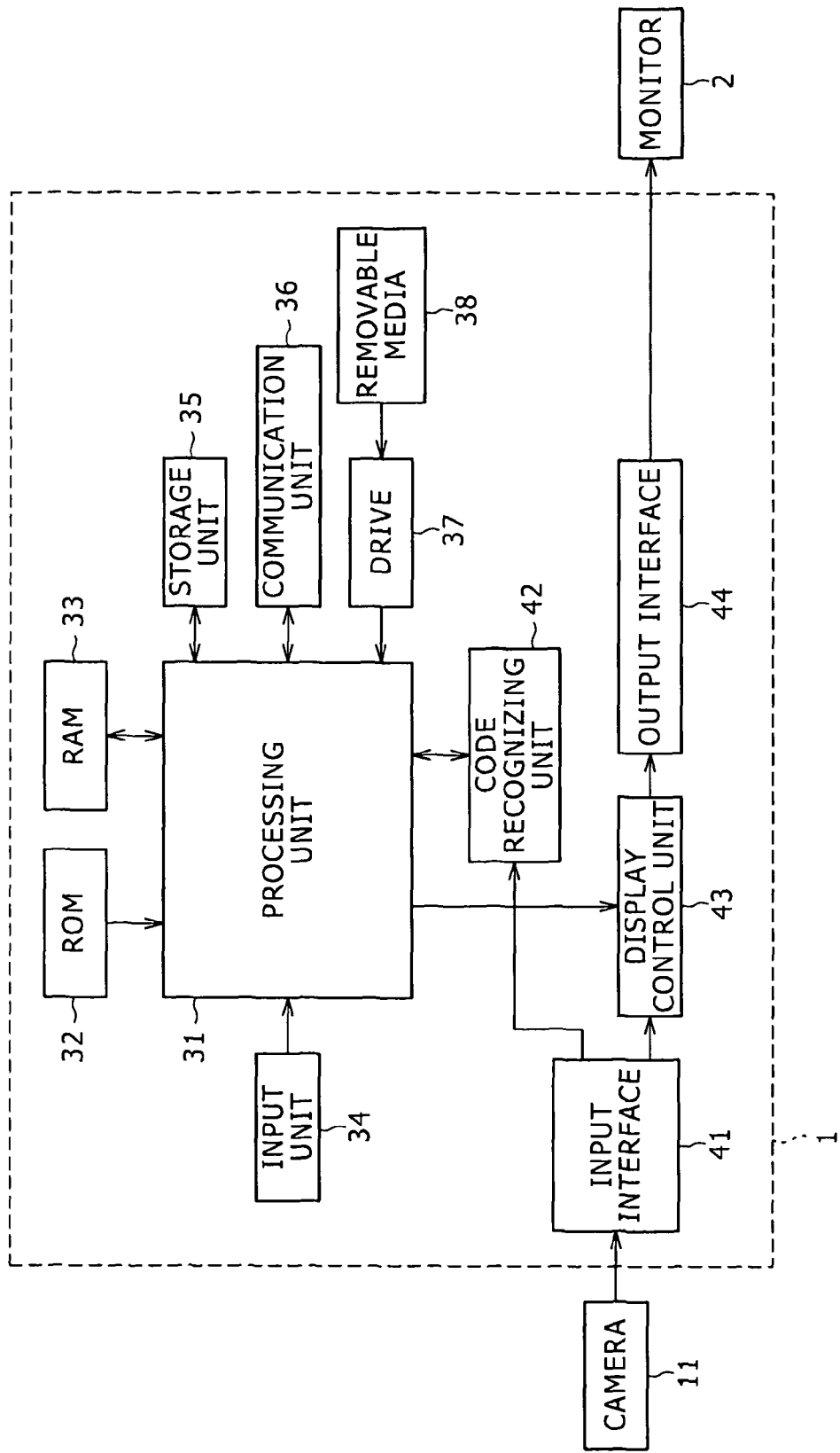
FIG. 13 is a block diagram showing an example of configuration of the personal computer in FIG. 12.

FIG. 13 shows an example of configuration of the personal computer 1.

A processing unit 31 is formed by an arithmetic unit, a control unit and the like. The processing unit 31 controls various parts using a ROM 32, a RAM 33 and the like. That is, the processing unit 31 operates as a CPU (Central Processing Unit) in the personal computer 1.

The ROM 32 is a read-only mask ROM in which data and a program are written to a circuit of the ROM at a time of manufacturing. The ROM 32 supplies the data and the program to the processing unit 31 as occasion demands. The RAM 33 is a semiconductor memory in which data can be updated. The RAM 33 temporarily retains a process (program) being executed by the processing unit 31 and data necessary for the process under control of the processing unit 31.

An input unit 34 is formed by input devices such for example as a keyboard and a mouse. The input unit 34 supplies an instruction input by an operation of the input unit 34 by a user to the processing unit 31.

A storage unit 35 is formed by a nonvolatile storage medium such for example as a hard disk. The storage unit 35 stores various information such as programs to be executed by the processing unit 31 and data, and supplies these pieces of information to the processing unit 31 as occasion demands.

A communicating unit 36 is controlled by the processing unit 31 to be connected to a network not shown in the figure. The communicating unit 36 communicates with another personal computer or the like not shown in the figure to send and receive information.

A drive 37 drives removable media 38 loaded into the drive 37, reads data stored on the removable media 38, and supplies the data to the processing unit 31. For example, the removable media 38 includes a magnetic disk (including flexible disks), an optical disk (including CD-ROM (Compact Disk-Read Only Memory) and DVD (Digital Versatile Disk)), a magneto-optical disk (including MD (Mini-Disk) (registered trademark), a semiconductor memory, a hard disk and the like. The drive 37 can read a program recorded on the removable media 38 for the processing unit 31 to execute the program.

An input interface 41 is an interface for connecting a device external to the personal computer 1 and the personal computer 1 by a predetermined system such for example as USB (Universal Serial Bus) or IEEE (Institute of Electrical and Electronic Engineers) 1394, and supplying information from the external device to the personal computer 1. In FIG. 13, the input interface 41 is connected to the camera 11. The input interface 41 supplies image information from the camera 11 to a code recognizing unit 42 or a display control unit 43.

The code recognizing unit 42 is controlled by the processing unit 31 to recognize the 2D code 101 from an image taken by the camera 11 which image is obtained via the input interface 41. Details of the process of recognizing the 2D code in the code recognizing unit 42 will be described later. When the code recognizing unit 42 recognizes the 2D code 101, the code recognizing unit 42 supplies a result of the recognition to the processing unit 31. The processing unit 31 performs a process on the basis of the result of the recognition.

The display control unit 43 has a buffer memory for an image which memory is not shown in the figure. The display control unit 43 performs a process related to generation of a display image to be displayed on the monitor 2. For example, the display control unit 43 is controlled by the processing unit 31 to supply the image taken by the camera 11 which image is obtained via the input interface 41 to an output interface 44.

The output interface 44 is connected to the monitor 2 to supply the image data or the like from the display control unit 43 to the monitor 2.

The 2D code recognizing process of the code recognizing unit 42 will next be described with reference to a flowchart of FIG. 14.

In step S101, a process of ternarizing image data (image data including the image of the 2D code 101) obtained as a result of image pickup by the camera 11 is performed. Details of this process are shown in a flowchart of FIG. 15.

In step S111, the code recognizing unit 42 selects one pixel forming the image data obtained as a result of image pickup by the camera 11.

In next step S112, the code recognizing unit 42 calculates an average value of luminance values of the selected pixel and pixels surrounding the selected pixel (for example four adjacent pixels).

In step S113, the code recognizing unit 42 sets a value obtained by multiplying the average value calculated in step S112 by 0.1 (a luminance value equal to 10% of the average value) as a first threshold value.

In step S114, the code recognizing unit 42 sets a value obtained by multiplying the average value calculated in step S112 by 0.6 (a luminance value equal to 60% of the average value) as a second threshold value.

In next step S115, the code recognizing unit 42 compares the luminance value of the pixel selected in step S111, the first threshold value, and the second threshold value with each other, and ternarizes the pixel according to a result of the comparison as follows.

Luminance Value of Pixel≦First Threshold Value→"0"

First Threshold Value<Luminance Value of Pixel≦Second Threshold Value→"1"

Second Threshold Value<Luminance Value of Pixel→"2"

That is, the pixel having a luminance value equal to or lower than the first threshold value is encoded into "0," and the pixel is black on display. The pixel thus encoded into "0" will hereinafter be referred to as a black pixel. The pixel having a luminance value higher than the first threshold value and equal to or lower than the second threshold value is encoded into "1," and the pixel is gray on display. The pixel thus encoded into "1" will hereinafter be referred to as a gray pixel. The pixel having a luminance value higher than the second threshold value is encoded into "2," and the pixel is white on display. The pixel thus encoded into "2" will hereinafter be referred to as a white pixel.

Figure 9:
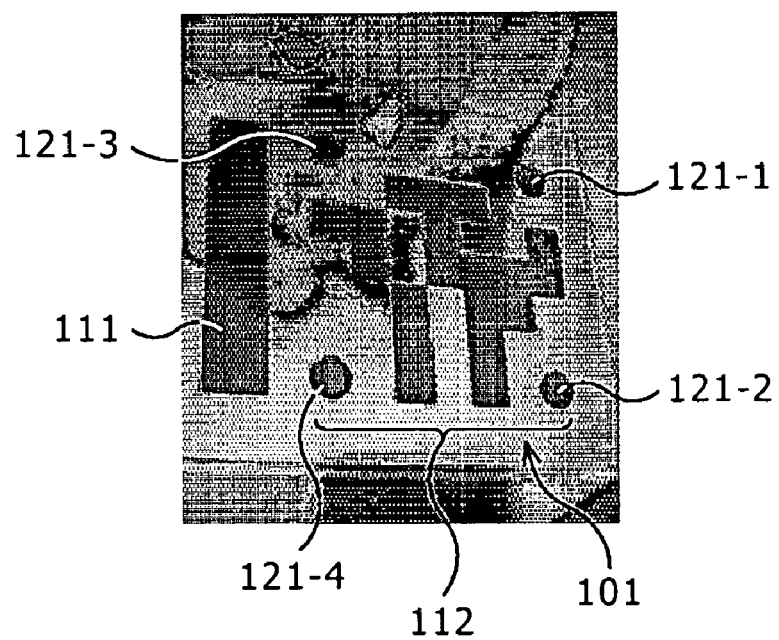
FIG. 9 is a diagram showing an example of a picked-up image of a 2D code.
Figure 16:
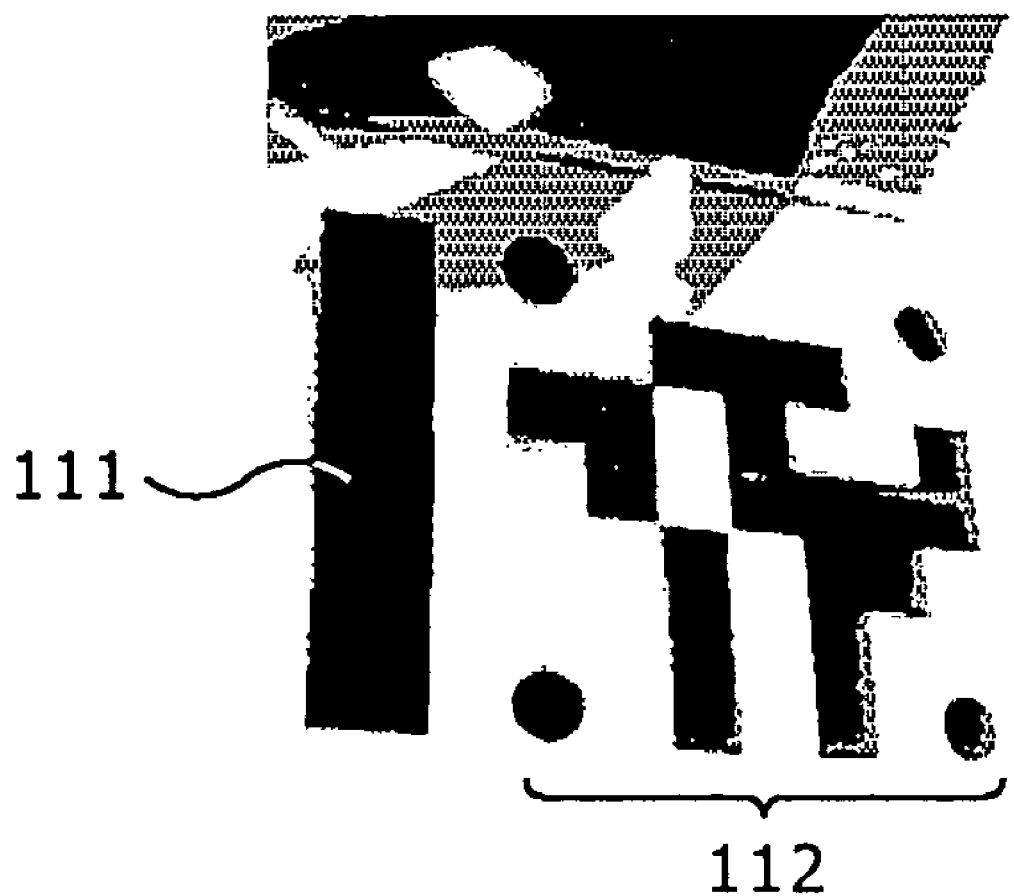
FIG. 16 is a diagram showing an example of a ternarized image.

FIG. 16 shows an example of a display when the image shown in FIG. 9 is ternarized as described above. Parts darkened by a shadow are shown in gray.

Returning to FIG. 15, in step S116, the code recognizing unit 42 determines whether all pixels have been selected. When the code recognizing unit 42 determines that there remain pixels yet to be selected, the code recognizing unit 42 returns to step S111 to select a next pixel, and similarly perform the process from step S112 on down.

When the code recognizing unit 42 determines in step S116 that all the pixels have been selected, that is, when each pixel is ternarized into one of the value 0, the value 1, and the value 2, the process proceeds to step S102 in FIG. 14.

In step S102, a process of detecting a position determining part is performed. This process detects a guide part 111, an upper left corner cell 121-1, and an upper right corner cell 121-2 (hereinafter referred to collectively as a position determining part as appropriate) of the 2D code 101 (FIG. 2). Details of this process are shown in a flowchart of FIG. 17.

Figure 15:
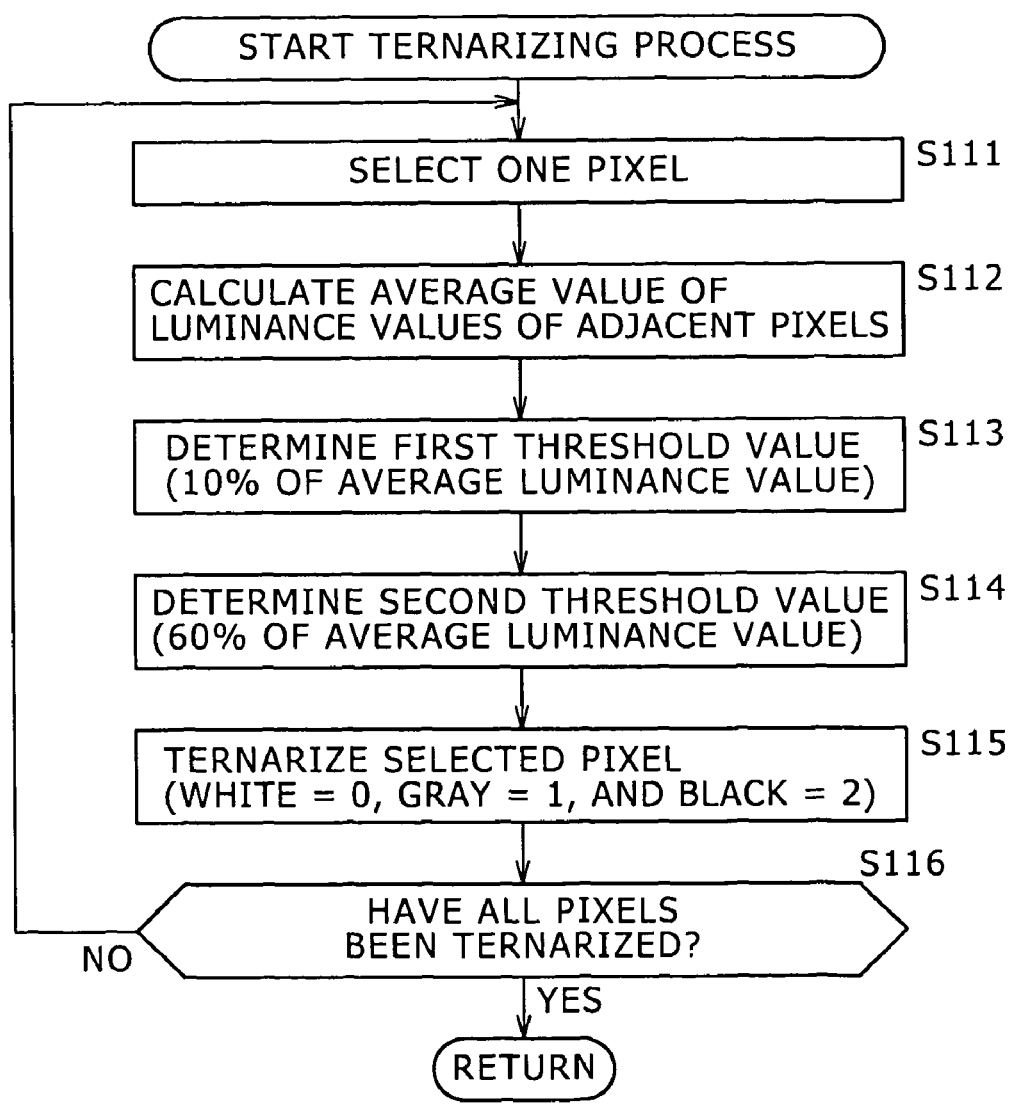
FIG. 15 is a flowchart of assistance in explaining a ternarizing process in step S101 in FIG. 14.

In step S121, the code recognizing unit 42 binarizes each pixel using the first threshold value calculated in step S113 in FIG. 15. Specifically, pixels having a ternarized value "0" are binarized into "0" (black), and pixels having ternarized values "1" and "2" are binarized into "2" (white).

Figures 4, 5:
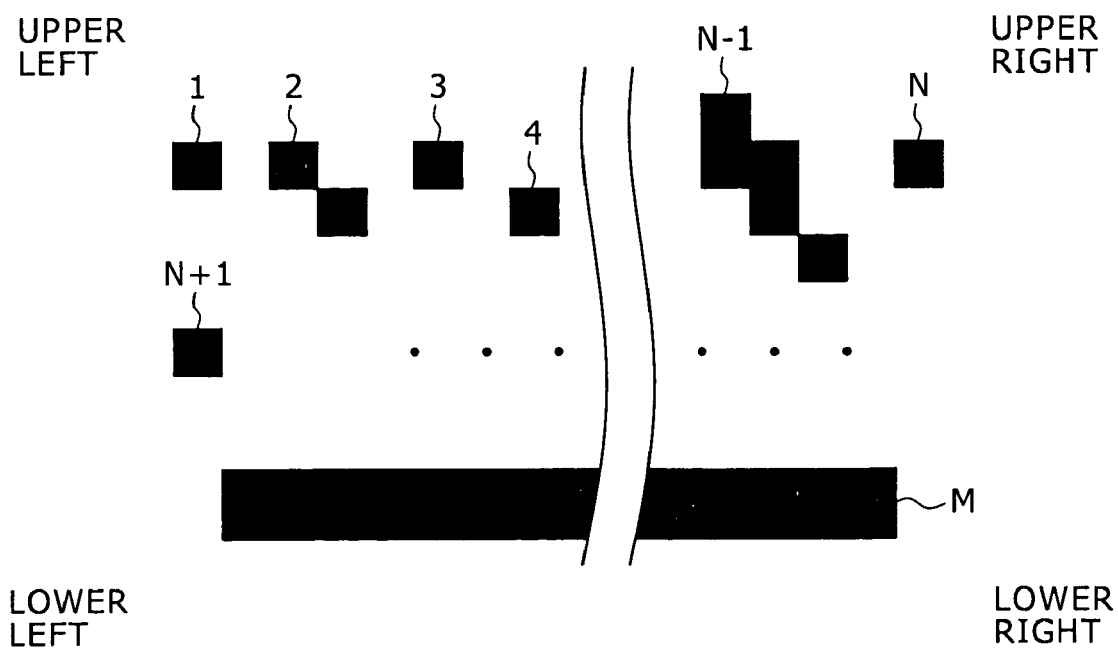
FIG. 4 is a diagram showing an example of threshold values used in a binarizing process in step S2 in FIG. 3.
FIG. 5 is a diagram showing an example of black pixel connected areas.

In addition, the code recognizing unit 42 sets numbers to (labels) areas where black pixels are connected to each other (hereinafter referred to as black pixel connected areas) in order from an upper left to a lower right with an area where black pixels are connected to each other as one area (FIG. 5).

In next step S122, the code recognizing unit 42 initializes the value of a counter i counting the number of black pixel connected areas to one. In step S123, the code recognizing unit 42 searches for a black pixel connected area along a locus of a counterclockwise spiral from a center point of a frame, for example, and selects a black pixel connected area detected first as a guide part candidate area.

Figure 6:
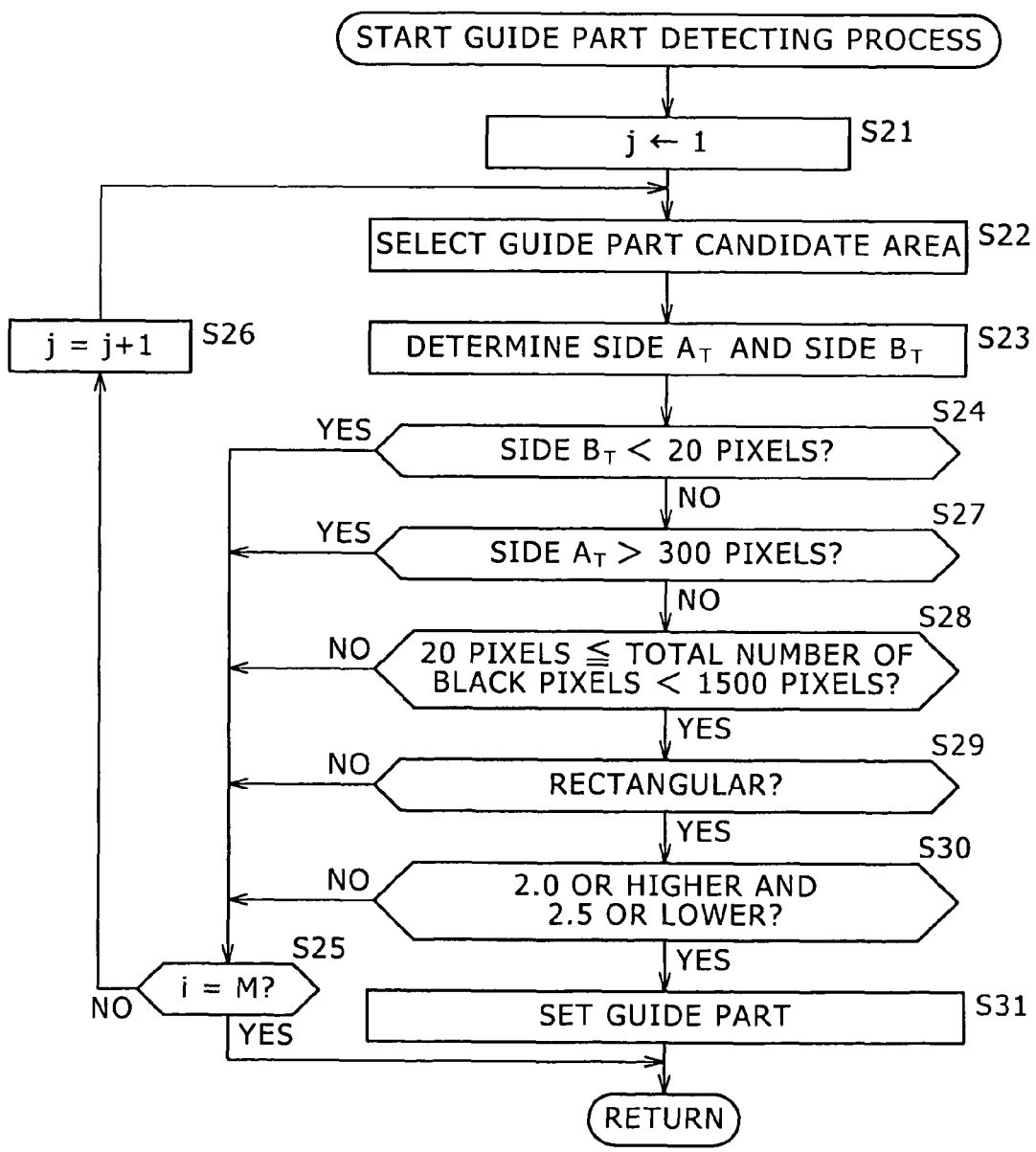
FIG. 6 is a flowchart of assistance in explaining a guide part detecting process in step S7 in FIG. 3.
Figure 7:
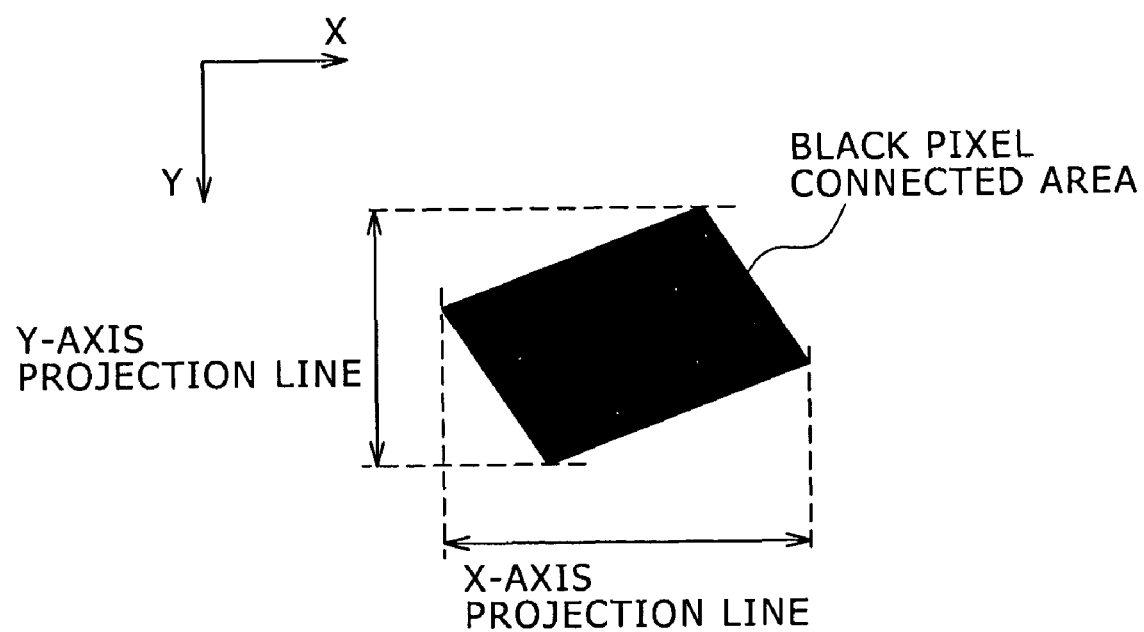
FIG. 7 is a diagram of assistance in explaining a method of determining a short axis and a long axis of a cell.

In next step S124, the code recognizing unit 42 performs a process corresponding to the process of steps S23 to S30 in FIG. 6 (a process of examining the guide part candidate area). In step S125, the code recognizing unit 42 determines whether the guide part candidate area selected in step S123 is the guide part 111. When the code recognizing unit 42 determines that the guide part candidate area selected in step S123 is not the guide part 111, the process proceeds to step S126.

In step S126, the code recognizing unit 42 determines whether the value of the counter i is equal to a total number M of black pixel connected areas (i=M). When the code recognizing unit 42 determines that i is not equal to M, the process proceeds to step S127, where the code recognizing unit 42 increments the value of the counter i by one. The process thereafter returns to step S123. Then, a black pixel connected area detected next is set as a next guide part candidate area, and a similar process is performed.

When the code recognizing unit 42 determines in step S125 that the guide part candidate area is the guide part 111, the process proceeds to step S128, where the code recognizing unit 42 sets the guide part candidate area selected in step S123 as the guide part 111 (assumes the guide part candidate area selected in step S123 to be the guide part 111). For example, the number of the black pixel connected area set as the guide part 111 is stored in the RAM 33.

In next step S129, the code recognizing unit 42 initializes the value of a counter j counting the number of black pixel connected areas to one. In step S130, the code recognizing unit 42 detects a black pixel connected area having a number corresponding to the value, and selects the black pixel connected area as an upper left corner cell candidate area.

Figure 8:
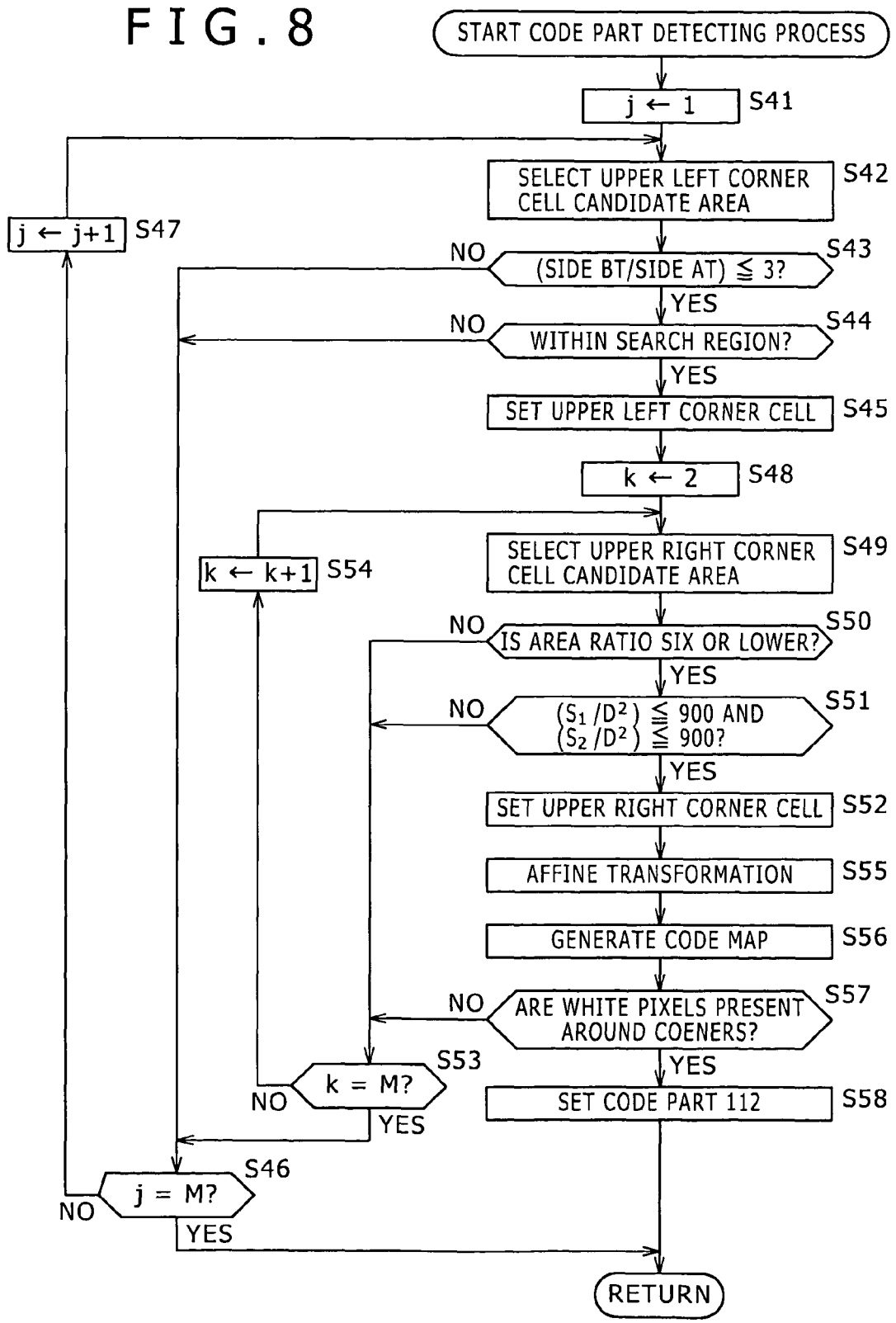
FIG. 8 is a flowchart of assistance in explaining a code part detecting process in step S9 in FIG. 3.

In step S131, the code recognizing unit 42 performs a process corresponding to the process of steps S43 and S44 in FIG. 8 (a process of examining the upper left corner cell candidate area). In step S132, the code recognizing unit 42 determines whether the upper left corner cell candidate area selected in step S130 is the upper left corner cell 121-1. When the code recognizing unit 42 determines that the upper left corner cell candidate area selected in step S130 is not the upper left corner cell 121-1, the process proceeds to step S133.

In step S133, the code recognizing unit 42 determines whether the value of the counter j is equal to the total number M of black pixel connected areas (j=M). When the code recognizing unit 42 determines that j is not equal to M, the process proceeds to step S134, where the code recognizing unit 42 increments the value of the counter j by one. The process thereafter returns to step S130. Then, a black pixel connected area having a next number is set as a next upper left corner cell candidate area, and a similar process is performed.

When the code recognizing unit 42 determines in step S132 that the upper left corner cell candidate area selected in step S130 is the upper left corner cell 121-1, the code recognizing unit 42 in step S135 sets the upper left corner cell candidate area selected in step S130 as the upper left corner cell 121-1 (assumes the upper left corner cell candidate area selected in step S130 to be the upper left corner cell 121-1).

In next step S136, the code recognizing unit 42 initializes the value of another counter k counting the number of black pixel connected areas to two. In step S137, the code recognizing unit 42 detects a black pixel connected area having a number corresponding to the value of the counter k, and selects the black pixel connected area as an upper right corner cell candidate area.

In step S138, the code recognizing unit 42 performs a process corresponding to the process of steps S50 and S51 in FIG. 8 (a process of examining the upper right corner cell candidate area). In step S139, the code recognizing unit 42 determines whether the upper right corner cell candidate area selected in step S137 is the upper right corner cell 121-2. When the code recognizing unit 42 determines that the upper right corner cell candidate area selected in step S137 is the upper right corner cell 121-2, the code recognizing unit 42 in step S142 sets the upper right corner cell candidate area selected in step S137 as the upper right corner cell 121-2 (assumes the upper right corner cell candidate area selected in step S137 to be the upper right corner cell 121-2).

In next step S143, the code recognizing unit 42 subjects an area defined by the guide part 111 set in step S128, the upper left corner cell 121-1 set in step S135, and the upper right corner cell 121-2 set in step S142 to an affine transformation so as to convert the defined area to an area having a length of seven blocks in an X-axis direction and a length of 9.5 blocks in a Y-axis direction on display. Incidentally, the length of one side of one block is calculated on the basis of a side AT or a side BT of the guide part 111 set in step S128.

The code recognizing unit 42 then removes an area (7×2.5 block area) of the guide part 111 set in step S128 and a 7×1 block on an upper side of the guide part 111 (a block corresponding to a 7×1 block between the guide part 111 and a code part 112) (FIG. 1) from the image resulting from the affine transformation. The code recognizing unit 42 maps black pixel connected areas as cells onto the region of a 7×7 block area obtained as a result of the removal, and thereby generates a code map.

In step S144, the code recognizing unit 42 detects four corner cells among the cells on the code map generated in step S143, and determines whether three-block areas around the four corner cells are white pixels (FIG. 2). When the three-block areas around the four corner cells are white pixels, the code recognizing unit 42 in step S145 finalizes the setting of the guide part 111, the upper left corner cell 121-1, and the upper right corner cell 121-2 set in step S128, step S135, and step S142, respectively.

When the code recognizing unit 42 determines in step S139 that the upper right corner cell candidate selected in step S137 is not the upper right corner cell 121-2, or when the code recognizing unit 42 determines in step S144 that the three-block areas around the four corner cells are not white pixels, the process proceeds to step S140, where the code recognizing unit 42 determines whether the value of the counter k is equal to the total number M of black pixel connected areas (k=M). When the code recognizing unit 42 determines that k is not equal to M, the process proceeds to step S141, where the code recognizing unit 42 increments the value of the counter k by one. The process thereafter returns to step S137. That is, a black pixel connected area having a next number is set as a next upper right corner cell candidate area, and a similar process is performed.

When the code recognizing unit 42 determines in step S140 that k is equal to M, the process returns to step S133 to perform the process from step S133 on down. That is, the upper left corner cell 121-1 is detected again.

When the code recognizing unit 42 determines in step S126 that i is equal to M, or when the code recognizing unit 42 determines in step S133 that j is equal to M, it is determined that the 2D code 101 is not present in the image being subjected to the 2D code recognizing process this time, and the process is ended.

When the process of detecting the position determining part is thus completed, the process proceeds to step S103 in FIG. 14, where the code recognizing unit 42 determines whether the position determining part is determined. When the code recognizing unit 42 determines that the position determining part is determined, the process proceeds to step S104, where a process of detecting a code part is performed. Details of this process are shown in a flowchart of FIG. 18.

In step S151, the code recognizing unit 42 performs a binarizing process on the basis of the second threshold value calculated in step S114 in FIG. 15. Specifically, pixels having ternarized values "0" and "1" are binarized into "0" (black), and pixels having a ternarized value "2" are binarized into "2" (white).

In addition, the code recognizing unit 42 sets numbers to (labels) areas where black pixels are connected to each other (black pixel connected areas) in order from an upper left to a lower right with an area where black pixels are connected to each other as one area (FIG. 5).

Figure 17:
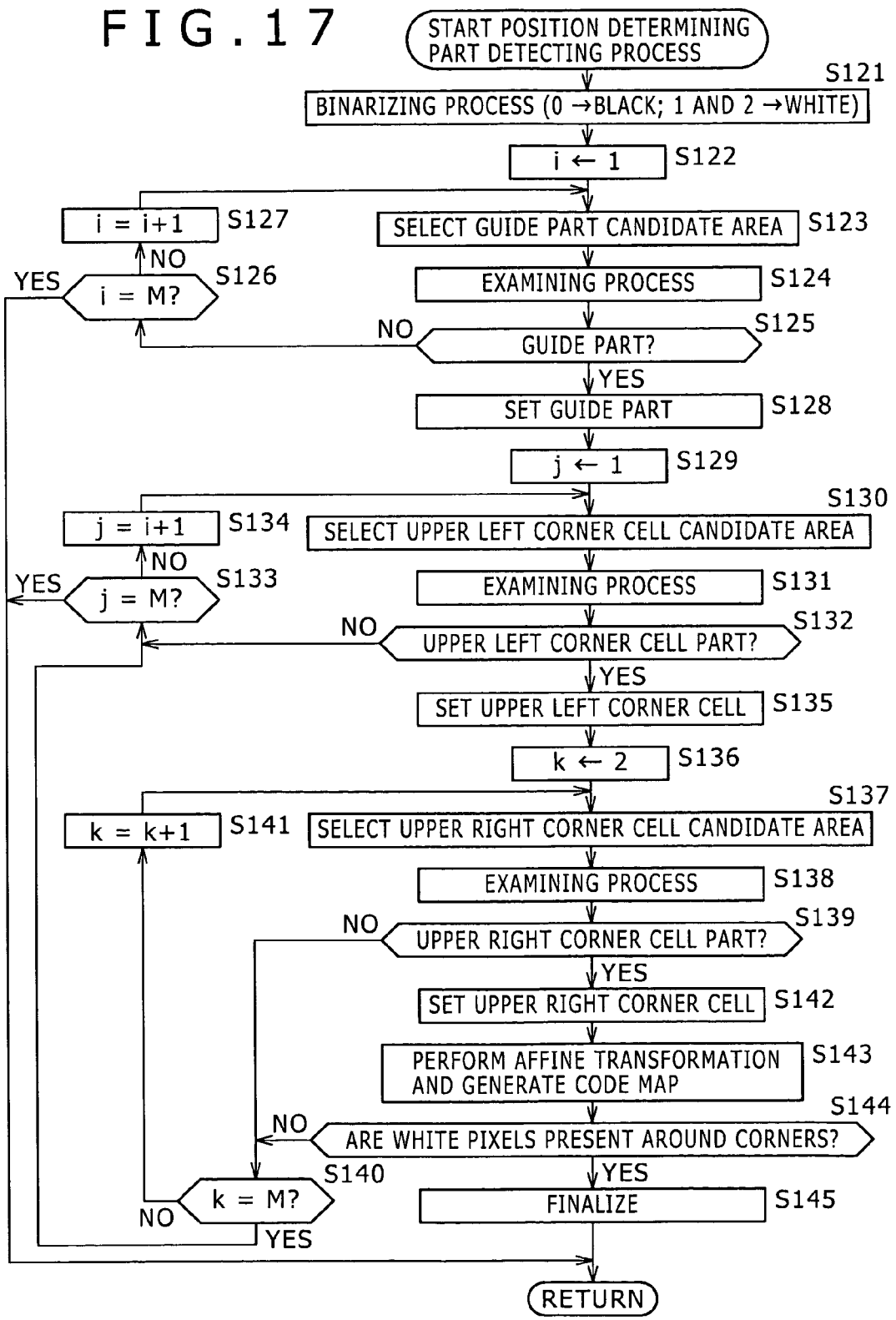
FIG. 17 is a flowchart of assistance in explaining a position determining part detecting process in step S102 in FIG. 14.

In next step S152, the code recognizing unit 42 determines the area identified by the guide part 111 set in step S128 in FIG. 17, the upper left corner cell 121-1 set in step S135, and the upper right corner cell 121-2 set in step S142. In step S153, the code recognizing unit 42 subjects the area to an affine transformation so as to convert the area into an area having a length of 7 blocks in an X-axis direction and a length of 9.5 blocks in a Y-axis direction on display. Incidentally, the length of one side of one block is calculated on the basis of a side AT or a side BT of the guide part 111 set in step S128.

In next step S154, the code recognizing unit 42 removes an area (7×2.5 block area) of the guide part 111 set in step S128 in FIG. 17 and a 7×1 block on an upper side of the guide part 111 (a block corresponding to a 7×1 block between the guide part 111 and the code part 112) (FIG. 1) from the image resulting from the transformation in step S153. The code recognizing unit 42 maps black pixel connected areas as cells onto the region of a 7×7 block area obtained as a result of the removal, and thereby generates a code map.

In step S155, the code recognizing unit 42 sets the code map generated in step S154 as the code part 112 of the 2D code 101. The process thereafter proceeds to step S105 in FIG. 14.

In step S105, the code recognizing unit 42 calculates code data, that is, the value of the 2D code 101 from the code map of the detected code part 112, and retains the value of the 2D code 101. Then the process is ended.

When the code recognizing unit 42 determines in step S103 that the position determining part is not determined, it is determined that the 2D code 101 is not present in the image being subjected to the 2D code recognizing process this time, and the process is ended.

Figure 11:
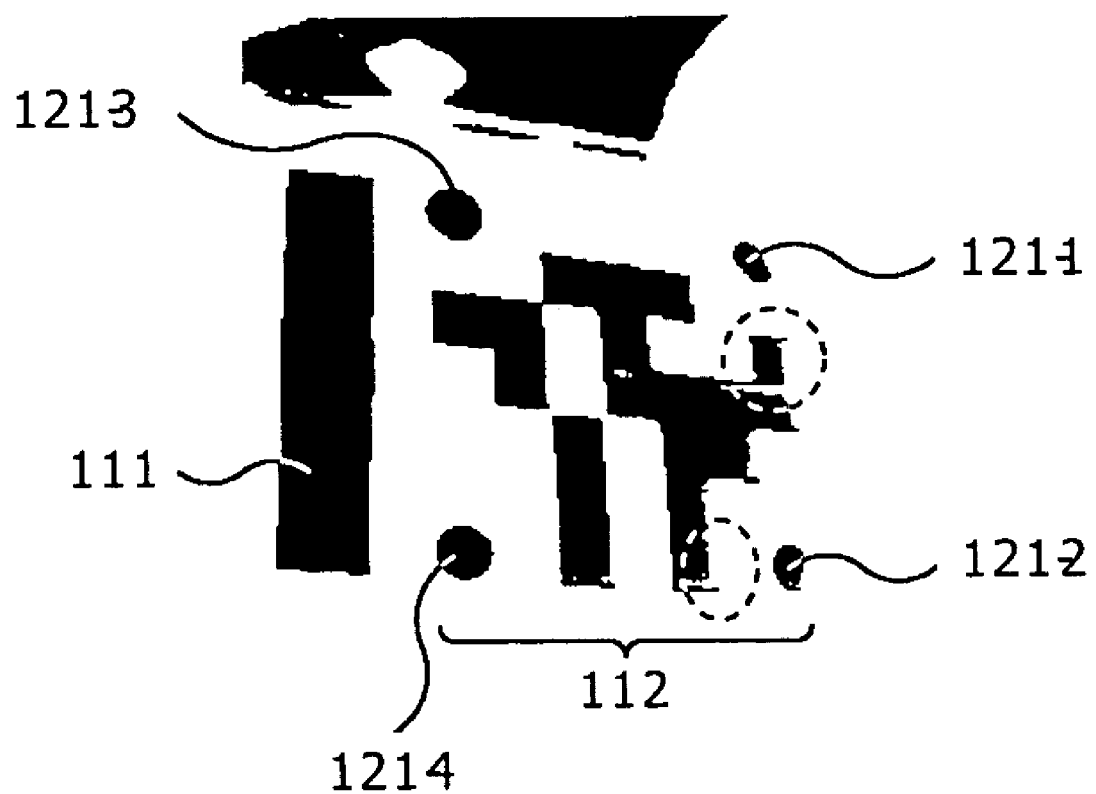
FIG. 11 is a diagram showing an example of another binarized image of the picked-up image of the 2D code.

Thus, when the position determining part of the 2D code 101 is detected, binarization is performed using the first threshold value, which is a low value (step S121 in FIG. 17). Therefore, even when image data of the 2D code 101 partly darkened by a shadow as shown in FIG. 9 is input as image data of the 2D code 101, it is possible to detect the guide part 111 using binarized data properly representing the guide part 111 as shown in FIG. 11 (binarized data in which gray pixels of the parts of the shadow (FIG. 16) are converted into white pixels because the first threshold value is low).

Figure 10:
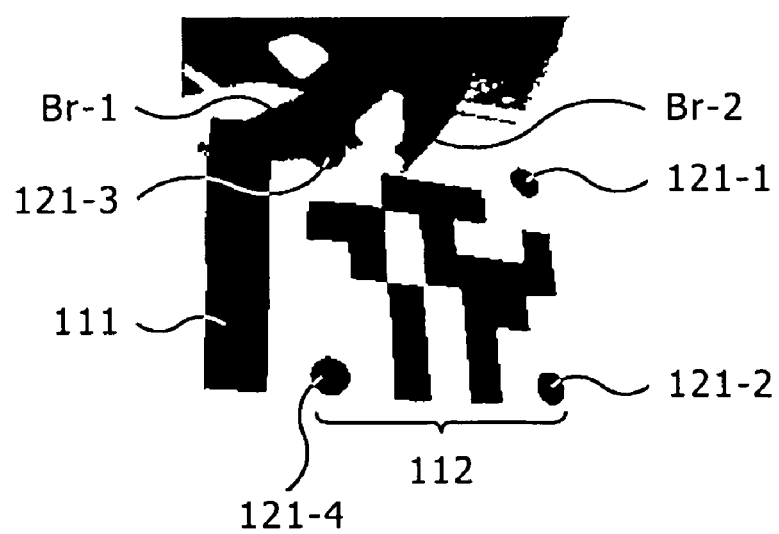
FIG. 10 is a diagram showing an example of a binarized image of the picked-up image of the 2D code.
Figure 18:
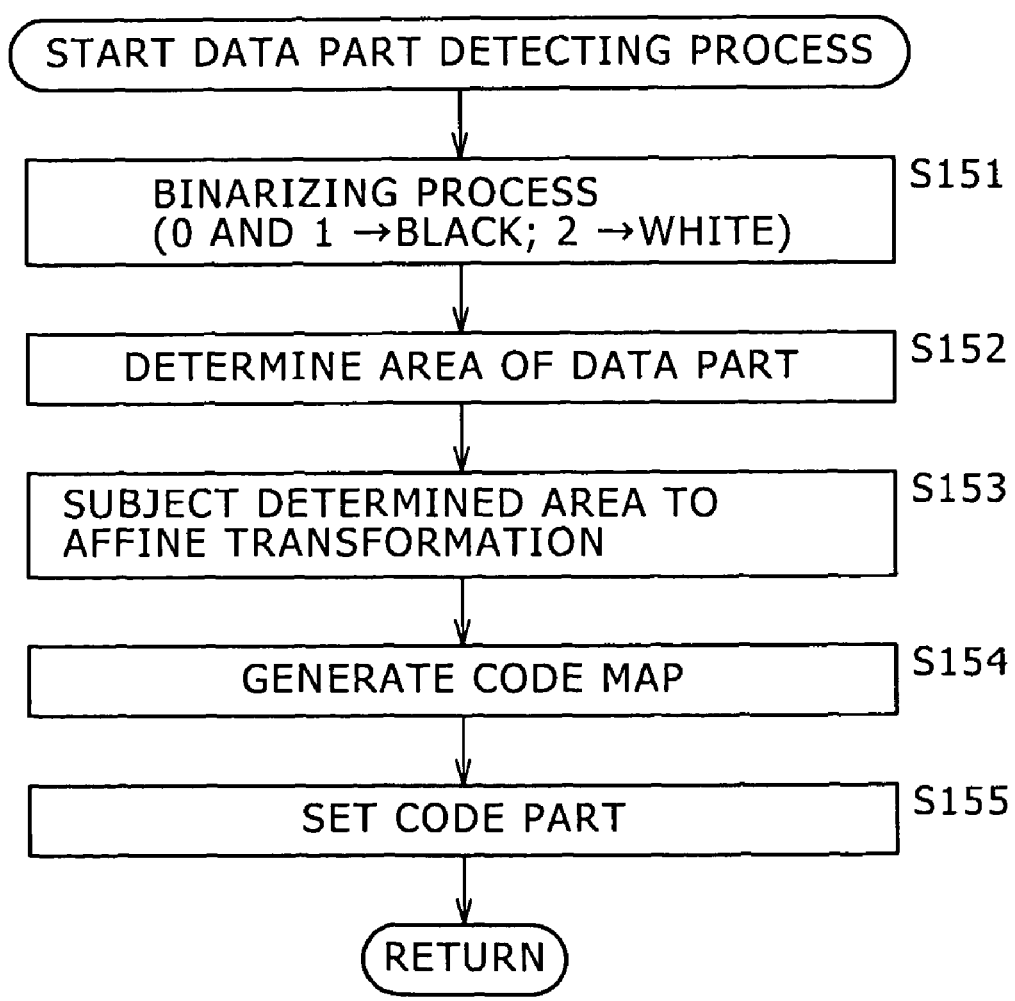
FIG. 18 is a flowchart of assistance in explaining a data part detecting process in step S104 in FIG. 14.

In addition, when the code part 112 is detected, binarization is performed using the second threshold value higher than the first threshold value (step S151 in FIG. 18). Therefore, the code part 112 is detected using binarized data properly representing the code part 112 as shown in FIG. 10 (binarized data in which parts of the coded cells 122 in the code part 112 are properly black pixels because the second threshold value is high).

Incidentally, the code part 112 is identified by the guide part 111 and the corner cells 121, and the outside of the area identified by the guide part 111 and the corner cells 121 is not treated as the code part 112. Thus, even when a part of the shadow in the vicinity of the code part 112 is black pixels (for example Br-2 in FIG. 10), and is connected to the coded cells 122 to form one black pixel connected area as shown in FIG. 10, the part is excluded, and the code part 112 is recognized. Therefore no particular problem is presented.

Thus, according to an embodiment of the present invention, even when the image of the 2D code 101 is partly darkened by a shadow cast on the 2D code 101, for example, the 2D code 101 can be properly recognized.

Incidentally, in the above, when the code part 112 of the 2D code 101 is detected, binarization is performed on the basis of the second threshold value (pixels having ternarized values "0" and "1" are binarized into "0" (black), and pixels having a ternarized value "2" are binarized into "2" (white)). However, for example, while the ternarized value "0" is binarized into "0" (black), and the ternarized value "2" is binarized into "2" (white), the ternarized value "1" can be converted to "0" or "2" according to the magnitude of the luminance values of pixels surrounding the pixel.

For example, when the average luminance value of the pixels surrounding the pixel having the ternarized value "1" is lower than the second threshold value, the ternarized value "1" can be converted to "2" (white), while when the average luminance value of the surrounding pixels is equal to or higher than the second threshold value, the ternarized value "1" can be converted to "0" (black). Thus, the pixel is binarized into a white pixel when the luminance value of the other pixels surrounding the pixel is low (dark), and the pixel is binarized into a black pixel when the luminance value of the other pixels surrounding the pixel is high (light). It is therefore possible to sharpen the contrast of the code part 112.

In addition, in the above, the image binarized with the first threshold value is used when the position determining part is detected, and the image binarized with the second threshold value is used when the code part 112 is detected. However, both the image binarized with the first threshold value and the image binarized with the second threshold value can be used when the position determining part or the code part 112 is detected. For example, when the guide part 111 is detected at the time of detecting the position determining part, gray pixels can be removed on the basis of differences obtained between the image of FIG. 10 (the image binarized with the first threshold value) and the image of FIG. 11 (the image binarized with the second threshold value). Therefore the guide part 111 can be detected properly.

Further, in the above, each pixel is binarized on the basis of the pixel value (luminance value) of the pixel, for example. However, for example, two pixels adjacent to each other can be binarized according to a relation between the pixel values of the two pixels.

In an example of FIGS. 19A and 19B, when as in FIG. 19A showing the ternarized values of upper and lower pixels, the value of an upper pixel is lower than the value of a lower pixel, the upper pixel is binarized into "0" (black), and the lower pixel is binarized into "2" (white), as shown in FIG. 19B. By thus performing binarization, even when the ternarized values vary as shown in FIG. 19A, it is possible to binarize the ternarized values into predetermined values as shown in FIG. 19B.

The series of processes described above can be carried out by software as well as hardware. When the series of processes is to be carried out by software, a program constituting the software is installed from a program recording medium onto a computer incorporated in special hardware, or for example a general-purpose personal computer that can perform various functions by installing various programs thereon.

It is to be noted that in the present specification, the steps describing the program stored on the program recording medium include not only processes carried out in time series in the described order but also processes carried out in parallel or individually and not necessarily in time series.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device for recognizing a two-dimensional code in which predetermined information is coded by two-dimensionally arranging a plurality of cells according to a predetermined arrangement rule, said information processing device comprising:

detecting means for detecting a position determining part used to identify an area of the cells in an image of said two-dimensional code in which area said predetermined information is coded; and obtaining means for obtaining said predetermined information from the arrangement rule of the cells present in the area identified by said position determining part detected by said detecting means;

wherein said detecting means detects said position determining part on a basis of binarized data obtained as a result of binarizing the image of said two-dimensional code on a basis of a first threshold value, and said obtaining means detects the arrangement rule of the cells present in the area identified by said position determining part on a basis of binarized data obtained as a result of binarizing the area identified by said position determining part on a basis of a second threshold value different from said first threshold value, and obtains said predetermined information.

2. The information processing device as claimed in claim 1, further comprising ternarizing means for ternarizing the image of said two-dimensional code on the basis of said first threshold value and said second threshold value, wherein said detecting means binarizes ternarized data obtained as a result of ternarizing the image of the two-dimensional code by said ternarizing means on the basis of said first threshold value, and said obtaining means binarizes the ternarized data obtained as the result of ternarizing the image of the two-dimensional code by said ternarizing means on the basis of said second threshold value.

3. The information processing device as claimed in claim 1, wherein said detecting means detects said position determining part on a basis of the binarized data obtained as the result of binarizing the image of said two-dimensional code on the basis of said first threshold value and binarized data obtained as a result of binarizing the image of the two-dimensional code on the basis of said second threshold value, and said obtaining means detects the arrangement rule of the cells present in the area identified by said position determining part on a basis of the binarized data obtained as the result of binarizing the area identified by said position determining part on the basis of said second threshold value and binarized data obtained as a result of binarizing the area identified by said position determining part on the basis of said first threshold value, and obtain said predetermined information.

4. An information processing method for recognizing a two-dimensional code in which predetermined information is coded by two-dimensionally arranging a plurality of cells according to a predetermined arrangement rule, said information processing method being performed by a computer and comprising the steps of:

detecting a position determining part used to identify an area of the cells in an image of said two-dimensional code in which area said predetermined information is coded; and obtaining said predetermined information from the arrangement rule of the cells present in the area identified by said position determining part detected by a process of said detecting step;

wherein said detecting step detects said position determining part on a basis of binarized data obtained as a result of binarizing the image of said two-dimensional code on a basis of a first threshold value, and said obtaining step detects the arrangement rule of the cells present in the area identified by said position determining part on a basis of binarized data obtained as a result of binarizing the area identified by said position determining part on a basis of a second threshold value different from said first threshold value, and obtains said predetermined information.

5. A computer-readable medium storing a program for making a computer perform information processing for recognizing a two-dimensional code in which predetermined information is coded by two-dimensionally arranging a plurality of cells according to a predetermined arrangement rule, said program, when implemented, comprising the steps of:

detecting a position determining part used to identify an area of the cells in an image of said two-dimensional code in which area said predetermined information is coded; and obtaining said predetermined information from the arrangement rule of the cells present in the area identified by said position determining part detected by a process of said detecting step;

wherein said detecting step detects said position determining part on a basis of binarized data obtained as a result of binarizing the image of said two-dimensional code on a basis of a first threshold value, and said obtaining step detects the arrangement rule of the cells present in the area identified by said position determining part on a basis of binarized data obtained as a result of binarizing the area identified by said position determining part on a basis of a second threshold value different from said first threshold value, and obtains said predetermined information.

6. An information processing device for recognizing a two-dimensional code in which predetermined information is coded by two-dimensionally arranging a plurality of cells according to a predetermined arrangement rule, said information processing device comprising:

detecting means for detecting a position determining part used to identify an area of the cells in an image of said two-dimensional code in which area said predetermined information is coded on a basis of binarized data obtained as a result of binarizing the image of said two-dimensional code on a basis of a first threshold value; and obtaining means for detecting the arrangement rule of the cells present in the area identified by said position determining part on a basis of binarized data obtained as a result of binarizing the area identified by said position determining part on a basis of a second threshold value different from said first threshold value, and obtaining said predetermined information from said arrangement rule;

wherein one of said detecting means and said obtaining means binarizes ternarized data obtained as a result of ternarizing the image of said two-dimensional code in each unit of a plurality of pieces of ternarized data in predetermined positional relation to each other on a basis of relative relation of said plurality of pieces of ternarized data.

7. An information processing method for recognizing a two-dimensional code in which predetermined information is coded by two-dimensionally arranging a plurality of cells according to a predetermined arrangement rule, said information processing method being performed by a computer and comprising the steps of:
    detecting a position determining part used to identify an area of the cells in an image of said two-dimensional code in which area said predetermined information is coded on a basis of binarized data obtained as a result of binarizing the image of said two-dimensional code on a basis of a first threshold value; and
    detecting the arrangement rule of the cells present in the area identified by said position determining part on a basis of binarized data obtained as a result of binarizing the area identified by said position determining part on a basis of a second threshold value different from said first threshold value, and obtaining said predetermined information from said arrangement rule;
    wherein one of said detecting step and said obtaining step binarizes ternarized data obtained as a result of ternarizing the image of said two-dimensional code in each unit of a plurality of pieces of ternarized data in predetermined positional relation to each other on a basis of relative relation of said plurality of pieces of ternarized data.

8. A computer-readable medium storing a program for making a computer perform information processing for recognizing a two-dimensional code in which predetermined information is coded by two-dimensionally arranging a plurality of cells according to a predetermined arrangement rule, said program, when implemented, comprising the steps of:
    detecting a position determining part used to identify an area of the cells in an image of said two-dimensional code in which area said predetermined information is coded on a basis of binarized data obtained as a result of binarizing the image of said two-dimensional code on a basis of a first threshold value; and
    detecting the arrangement rule of the cells present in the area identified by said position determining part on a basis of binarized data obtained as a result of binarizing the area identified by said position determining part on a basis of a second threshold value different from said first threshold value, and obtaining said predetermined information from said arrangement rule;
    wherein one of said detecting step and said obtaining step binarizes ternarized data obtained as a result of ternarizing the image of said two-dimensional code in each unit of a plurality of pieces of ternarized data in predetermined positional relation to each other on a basis of relative relation of said plurality of pieces of ternarized data.

9. An information processing device for recognizing a two-dimensional code in which predetermined information is coded by two-dimensionally arranging a plurality of cells according to a predetermined arrangement rule, said information processing device comprising:
    a detecting section configured to detect a position determining part used to identify an area of the cells in an image of said two-dimensional code in which area said predetermined information is coded; and
    an obtaining section configured to obtain said predetermined information from the arrangement rule of the cells present in the area identified by said position determining part detected by said detecting section;
    wherein said detecting section detects said position determining part on a basis of binarized data obtained as a result of binarizing the image of said two-dimensional code on a basis of a first threshold value, and
    said obtaining section detects the arrangement rule of the cells present in the area identified by said position determining part on a basis of binarized data obtained as a result of binarizing the area identified by said position determining part on a basis of a second threshold value different from said first threshold value, and obtains said predetermined information.

10. An information processing device for recognizing a two-dimensional code in which predetermined information is coded by two-dimensionally arranging a plurality of cells according to a predetermined arrangement rule, said information processing device comprising:
    a detecting section configured to detect a position determining part used to identify an area of the cells in an image of said two-dimensional code in which area said predetermined information is coded on a basis of binarized data obtained as a result of binarizing the image of said two-dimensional code on a basis of a first threshold value; and
    an obtaining section configured to detect the arrangement rule of the cells present in the area identified by said position determining part on a basis of binarized data obtained as a result of binarizing the area identified by said position determining part on a basis of a second threshold value different from said first threshold value, and obtain said predetermined information from said arrangement rule;
    wherein one of said detecting section and said obtaining section binarizes ternarized data obtained as a result of ternarizing the image of said two-dimensional code in each unit of a plurality of pieces of ternarized data in predetermined positional relation to each other on a basis of relative relation of said plurality of pieces of ternarized data.

* * * * *